US009871920B1

(12) United States Patent
Truitt et al.

(10) Patent No.: US 9,871,920 B1
(45) Date of Patent: Jan. 16, 2018

(54) SECURELY AND EFFICIENTLY TRANSFERRING SENSITIVE INFORMATION VIA A TELEPHONE

(71) Applicant: Teleperformance SE, Paris (FR)

(72) Inventors: Alan Truitt, Draper, UT (US); Dev Mudaliar, South Jordan, UT (US)

(73) Assignee: TELEPERFORMANCE SE (FR)

( * ) Notice: Subject to any disclaimer, the term of this patent is extended or adjusted under 35 U.S.C. 154(b) by 0 days.

(21) Appl. No.: 15/670,849

(22) Filed: Aug. 7, 2017

Related U.S. Application Data

(63) Continuation of application No. 14/631,679, filed on Feb. 25, 2015, which is a continuation-in-part of
(Continued)

(51) Int. Cl.
| H04M 3/51 | (2006.01) |
| H04M 3/38 | (2006.01) |
| G06Q 30/00 | (2012.01) |
| G06Q 20/10 | (2012.01) |
| G06Q 30/06 | (2012.01) |
| H04L 29/06 | (2006.01) |

(Continued)

(52) U.S. Cl.
CPC ........ *H04M 3/5183* (2013.01); *G06Q 20/102* (2013.01); *G06Q 20/305* (2013.01); *G06Q 20/32* (2013.01); *G06Q 30/016* (2013.01); *G06Q 30/0613* (2013.01); *G06Q 30/0635* (2013.01); *H04L 63/0428* (2013.01); *H04L 63/08* (2013.01); *H04M 3/382* (2013.01); *H04M 3/51* (2013.01)

(58) Field of Classification Search
CPC ...................................... G06Q 30/06

USPC ........................................................ 705/26.1
See application file for complete search history.

(56) References Cited

U.S. PATENT DOCUMENTS

| 5,918,213 A | 6/1999 | Bernard |
| 6,373,939 B1 | 4/2002 | Reese et al. |

(Continued)

OTHER PUBLICATIONS

PCT/US2014/051336, International Search Report and Written Opinion, dated Nov. 4, 2014.

(Continued)

*Primary Examiner* — Mila Airapetian
(74) *Attorney, Agent, or Firm* — Kunzler, PC.

(57) ABSTRACT

An apparatus includes a communications module that establishes a verbal communication between an automated attendant of a company and a customer through an electronic device in the possession of the customer. An identification module receives an identifier that alerts the automated attendant and/or a computer system of the company that the customer has a customer profile stored electronically. The customer profile includes information to identify the customer. The identifier is received in conjunction with the verbal communication, and includes an electronic data signal. The customer profile is stored previous to the verbal communication. An ID confirmation module receives an identification confirmation in response to identifying information input by the customer matching the information to identify the customer in the customer profile. The identity of the customer is confirmed electronically. A notification module sends a message to the automated attendant indicating that the ID confirmation module received the identification confirmation.

19 Claims, 21 Drawing Sheets

Related U.S. Application Data application No. 14/198,384, filed on Mar. 5, 2014, now Pat. No. 9,026,464, which is a continuation-in-part of application No. 13/967,608, filed on Aug. 15, 2013, now Pat. No. 9,613,370.

(51) Int. Cl.
*G06Q 20/32* (2012.01)
*G06Q 20/30* (2012.01)

(56) References Cited

U.S. PATENT DOCUMENTS

| | | | |
|---|---|---|---|
| 6,442,251 | B1 | 8/2002 | Maes et al. |
| 6,766,007 | B1 | 7/2004 | Dermler et al. |
| 6,850,901 | B1 | 2/2005 | Hunter |
| 7,561,676 | B2 | 7/2009 | Fernandes et al. |
| 7,792,095 | B2 | 9/2010 | Srinivansan |
| 7,908,381 | B2 | 3/2011 | Koch et al. |
| 8,117,084 | B2 | 2/2012 | Siegrist |
| 8,265,247 | B2 | 9/2012 | Baccay |
| 8,306,868 | B2 | 11/2012 | Sivanathan et al. |
| 8,670,529 | B1 | 3/2014 | Fomin |
| 2002/0046086 | A1 | 4/2002 | Pletz |
| 2003/0187752 | A1 | 10/2003 | Kapiainen et al. |
| 2005/0165648 | A1 | 7/2005 | Razumov |
| 2006/0265327 | A1* | 11/2006 | Rao .............. G06Q 20/102 705/40 |
| 2008/0064363 | A1 | 3/2008 | Salafia et al. |
| 2008/0066098 | A1 | 3/2008 | Witteman |
| 2010/0241566 | A1 | 9/2010 | Kim |
| 2010/0262506 | A1 | 10/2010 | Zargahi et al. |
| 2010/0299178 | A1 | 11/2010 | Druzhnikov |
| 2011/0289000 | A1 | 11/2011 | Palermo |
| 2012/0231876 | A1 | 9/2012 | de Cuba |
| 2012/0310752 | A1 | 12/2012 | Gaddis |
| 2013/0304638 | A1 | 11/2013 | Schoenberg |
| 2014/0302814 | A1* | 10/2014 | Roncoroni .......... G06Q 20/027 455/408 |

OTHER PUBLICATIONS

Yung Fu Chang, et al., Smart Phone for Mobile Commerce, Computer Standards & Interfaces, www.elsevier.com/locate/csi, Available Online Oct. 26, 2008.
U.S. Appl. No. 13/967,608 Office Action dated Mar. 2, 2015.
U.S. Appl. No. 14/198,384 Notice of Allowance dated Mar. 11, 2015.
U.S. Appl. No. 14/198,384 Office Action dated Aug. 6, 2014.
U.S. Appl. No. 14/198,384 Office Action dated Jan. 2, 2015.
U.S. Appl. No. 13/967,608 Final Office Action dated Jul. 29, 2015.
U.S. Appl. No. 13/967,608, filed Aug. 15, 2013, Final Office Action dated Jul. 26, 2016.
U.S. Appl. No. 13/967,608, filed Aug. 15, 2013, Office Action dated Feb. 19, 2016.
PCI Council Sets Call Center Guidance, Mar. 21, 2011, American Banker, vol. 176.
U.S. Appl. No. 13/967,608, filed Aug. 15, 2013, Notice of Allowance dated Jan. 31, 2017.
U.S. Appl. No. 14/703,656, filed May 4, 2015, Office Action dated Sep. 14, 2017.
U.S. Appl. No. 15/667,545, filed Aug. 2, 2017, Office Action dated Oct. 31, 2017.

\* cited by examiner

SECURELY AND EFFICIENTLY TRANSFERRING SENSITIVE INFORMATION VIA A TELEPHONE

CROSS REFERENCE TO RELATED APPLICATIONS

This is a continuation application of and claims priority to U.S. patent application Ser. No. 14/631,679 entitled SECURELY AND EFFICIENTLY TRANSFERRING SENSITIVE INFORMATION VIA A TELEPHONE, filed Feb. 25, 2015 for Alan Truitt et al., which is a continuation-in-part application of and claims priority to U.S. patent application Ser. No. 14/198,384 entitled SECURELY AND EFFICIENTLY PROCESSING TELEPHONE ORDERS, filed Mar. 5, 2014 for Alan Truitt, which is a continuation-in-part of U.S. patent application Ser. No. 13/967,608 entitled SECURELY AND EFFICIENTLY PROCESSING TELEPHONE ORDERS and filed on Aug. 15, 2013 for Alan Truitt, each of which is incorporated herein by reference.

FIELD

This invention relates to telephone communications and more particularly relates to securely and more efficiently transferring sensitive date over a data network while simultaneously on the telephone, in essence binding the phone and data transaction as one.

BACKGROUND

Online shopping has proliferated in the last decade and continues to grow. Websites allow consumers to make purchases without the assistance of a customer service representative, streamlining the shopping experience. In addition, the automated storage and retrieval of customer information, including billing information, makes online transactions faster and more secure. For certain products and services, however, consumers may still need or desire to speak to a customer service representative. These products and services may be more complex or customers may simply be more comfortable being services by a human being, and in some cases, customer service representatives can help businesses complete a sale faster and more accurately than a website alone. In general, customers who place an order through a customer service representative will often give their billing information directly to the customer service representative in order for the customer sales representative to process the order. If a business already has a customer's billing information stored in its computer system, the customer service representative will often have access to and can view the customer billing information in order to process a sales order. In many cases, however, companies do not have the billing information for customers when they are calling to place an order, and this information must be captured to complete the order.

In addition to online shopping, numerous calls are made to airline reservation desks, banks, insurance companies, healthcare companies, wireless companies, cable companies, medical professionals, and others where sensitive information either needs to be collected or confirmed by a staff member, company service representative, etc. The customer providing the information typically has no idea if the person at the other end of the phone is trustworthy and gathering this type of sensitive information is time consuming.

SUMMARY

An apparatus for confirming identification of a customer, in one embodiment, includes a communications module that establishes a verbal communication between an automated attendant of a company and a customer through an electronic device in the possession of the customer. In a certain embodiment, the apparatus includes an identification module that receives an identifier. In a further embodiment, the identifier alerts the automated attendant and/or a computer system of the company that the customer has a customer profile stored electronically. In one embodiment, the customer profile includes information to identify the customer. In a certain embodiment, the identifier is received in conjunction with the verbal communication. In a further embodiment, the customer profile is stored previous to the verbal communication. In certain embodiments, the identifier includes an electronic data signal. In one embodiment, the apparatus includes an ID confirmation module that receives an identification confirmation in response to identifying information input by the customer matching the information to identify the customer in the customer profile. In a certain embodiment, the identity of the customer is confirmed electronically. In one embodiment, the apparatus includes a notification module that sends a message to the automated attendant indicating that the ID confirmation module received the identification confirmation.

In one embodiment, the apparatus includes a profile permission module that receives electronic access to the customer profile. In a certain embodiment, the customer profile includes identifying information of the customer. In a further embodiment, the profile permission module receives electronic access to the customer profile after the ID confirmation module receives the identification confirmation. In one embodiment, the apparatus includes a profile access module that accesses the customer profile to transmit information from the customer profile to the computer system of the company over a computer network. In a certain embodiment, the customer profile is stored electronically in a computer system external to a computer system available to the company and to the automated attendant.

In one embodiment, the communications module establishes a data connection, in conjunction with the verbal communication, between the company and the customer. In a certain embodiment, the identifying information stored in the customer profile includes a password and/or biometric information. In a further embodiment, the identifying information input by the customer is input through the electronic device using a camera of the electronic device, a biometric reader of the electronic device, a microphone of the electronic device and/or a keyboard of the electronic device.

In one embodiment, the customer profile is stored via a server separate from the electronic device of the customer and the computer system of the company. In a certain embodiment, the server sends the identification confirmation received by the ID confirmation module. In one embodiment, the apparatus includes an ID request module that sends a request to the customer to provide the identifying information by sending an electronic message to the electronic device and/or transmitting a voice prompt of the automated attendant. In one embodiment, the customer profile is stored by a computer system of the company.

In one embodiment, the apparatus includes a registration module that receives and stores information in the customer profile of the customer. In a certain embodiment, the registration module receives and stores the information in the customer profile in a transaction unrelated to the verbal communication. In one embodiment, the customer profile of the customer includes a shipping address, a residential address, a business address, a phone number, a fax number, an email address, a birth date, a social security number, healthcare information, a finger print, a retina scan, a voice print, a password, a user name, a preference, family information, security question information and/or financial information of the customer.

In one embodiment, the apparatus includes an ID comparison module that compares the identifying information input by the customer with the information to identify the customer in the customer profile in an electronic process. In a further embodiment, the apparatus includes an ID confirmation transmit module that transmits an identification confirmation to the computer system of the company in response to the identifying information input by the customer matching the information to identify the customer in the customer profile.

A method for confirming identification of a customer, in one embodiment, includes establishing a verbal communication between an automated attendant of a company and a customer through an electronic device of the customer. In a certain embodiment, the method includes receiving an identifier. In a further embodiment, the identifier alerts the automated attendant and/or a computer system of the company that the customer has a customer profile stored electronically. In one embodiment, the customer profile includes information to identify the customer. In a certain embodiment, the identifier is received in conjunction with the verbal communication. In a further embodiment, the customer profile is stored previous to the verbal communication. In one embodiment, the identifier includes an electronic data signal. In a certain embodiment, the method includes receiving an identification confirmation in response to identifying information input by the customer matching the information to identify the customer in the customer profile. In a further embodiment, the identity of the customer is confirmed electronically. In one embodiment, the method includes sending a message to the automated attendant indicating that the identification confirmation has been received.

In one embodiment, the method includes receiving electronic access to the customer profile. In a certain embodiment, the customer profile includes personal information of the customer. In a further embodiment, receiving electronic access to the customer profile is in response to receiving the identification confirmation. In a certain embodiment, the method includes accessing the customer profile to transmit information from the customer profile to the computer system of the company over a network.

In one embodiment, the identifying information stored in the customer profile includes a password and/or biometric information. In a certain embodiment, the identifying information input by the customer is input through the electronic device using a camera of the electronic device, a biometric reader of the electronic device, a microphone of the electronic device, and/or a keyboard of the electronic device. In one embodiment, the customer profile is stored electronically in a computer system external to a computer system available to the company.

In a certain embodiment, the method includes receiving and storing information in the customer profile of the customer. In a further embodiment, receiving and storing the information in the customer profile includes a transaction unrelated to the verbal communication. In one embodiment, the customer profile is stored by a computer system of the company.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
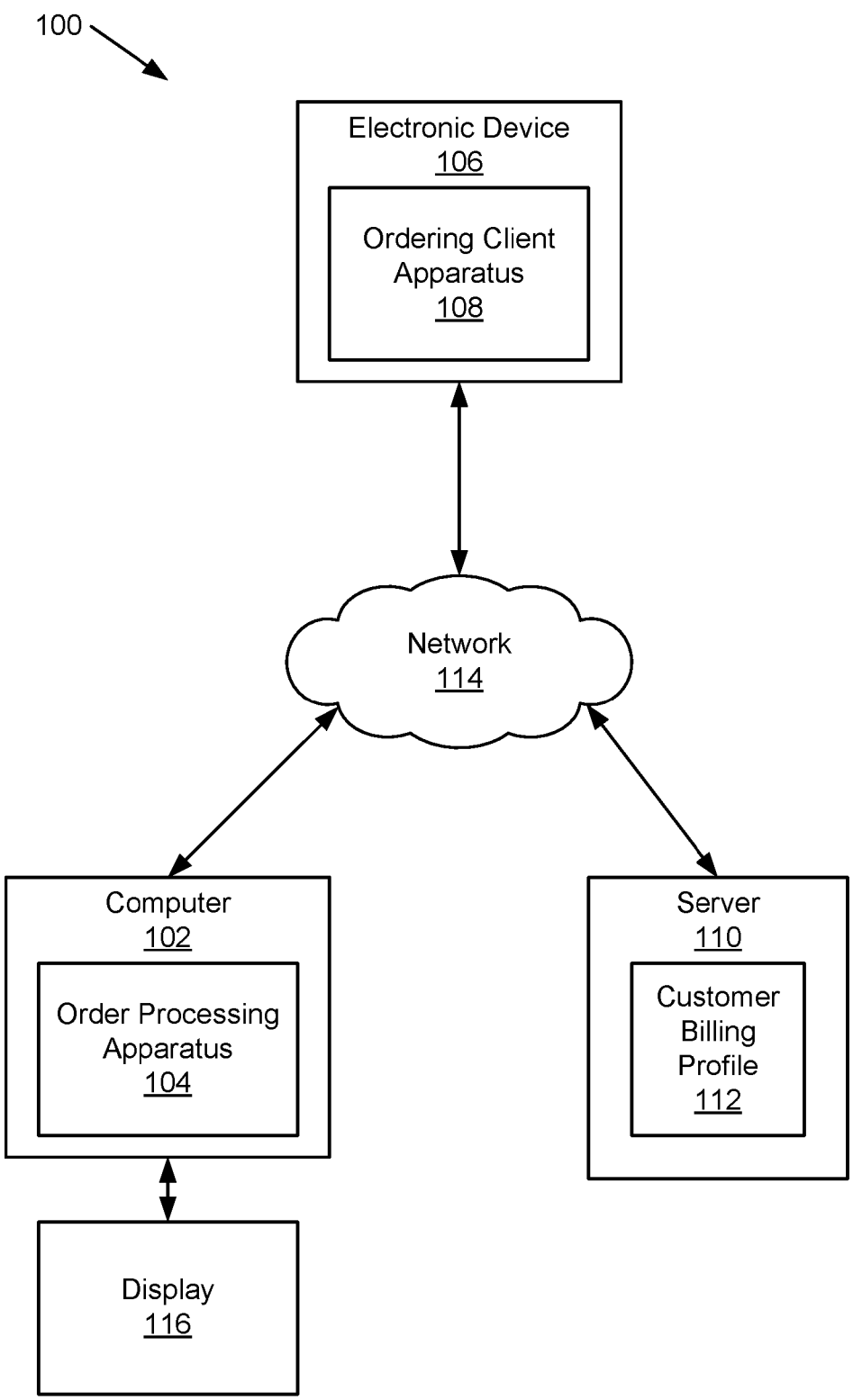
FIG. 1A is a schematic block diagram illustrating one embodiment of a system for processing telephone orders.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as hardware, such as a hardware circuit comprising custom VLSI circuits or gate arrays, off-the-shelf semiconductors such as logic chips, transistors, or other discrete components. A module may also be implemented in hardware as programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the executable code may be stored and/or propagated on in one or more computer readable medium(s).

The computer readable medium may be a non-transitory, tangible computer readable storage medium storing the executable code. The computer readable storage medium may be, for example, but not limited to, an electronic, magnetic, optical, electromagnetic, infrared, holographic, micromechanical, or semiconductor system, apparatus, or device, or any suitable combination of the foregoing, excluding transitory signals.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store executable code for use by and/or in connection with an instruction execution system, apparatus, or device.

The computer readable medium may also be a computer readable signal medium. A computer readable signal medium may include a propagated data signal with executable code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport executable code for use by or in connection with an instruction execution system, apparatus, or device. Executable code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, executable code may be both propagated as an electro-magnetic signal through a fiber optic cable for execution by a processor and stored on RAM storage device for execution by the processor.

Executable code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by executable code. The executable code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The executable code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The executable code may also be loaded onto a computer, other programmable data processing apparatus, or other devices to cause a series of operational steps to be performed on the computer, other programmable apparatus or other devices to produce a computer implemented process such that the executable code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the executable code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and executable code.

The description of elements in each figure may refer to elements of proceeding figures. Like numbers refer to like elements in all figures, including alternate embodiments of like elements.

This invention provides added security and efficiency in the processing of product orders with the help of customer service representatives. The invention encompasses apparatuses and methods that allow a customer to place a product order over a telephonic connection with a customer service representative without having to reveal his or her billing information, such as credit card or bank account number, to the customer service representative. With this invention, a customer can use an identifier to alert the merchant's computer system and the customer service representative that he or she has a customer billing profile stored at an independent location, such as the customer's electronic device or a third party computer system. When making his or her purchase, the customer can send his or her customer billing profile directly to the merchant, give approval for access to his or her customer billing profile on another system, or by default, give permission to send the customer billing profile in response to having already given the customer service representative his or her identifier during a telephonic connection. Throughout the transaction, the customer service representative cannot see the customer billing profile, which increases the security of the orders and a customer's financial information.

FIG. 1A is a schematic block diagram illustrating one embodiment of a system 100 for processing telephone orders. The system 100 includes a computer 102, an order processing apparatus 104, an electronic device 106, an ordering client apparatus 108, a server 110, a customer billing profile 112, and a network 114, which are described below.

The system 100, in one embodiment, includes a computer 102 with an order processing apparatus 104. The computer 102 may be connected to a display 116. The order processing apparatus 104, in one example, receives customer data over a network 114 from an electronic device 106. The electronic device 106, in one embodiment, includes an ordering client apparatus 108 to process a purchase order. In one embodiment, the order processing apparatus 104 accesses a customer billing profile 112 on a server 110 over a network to process a purchase order. The order processing apparatus 104 is described in more detail with respect to the apparatus 200 in FIG. 2 and the apparatus 300 in FIG. 3. The electronic device 106, in one embodiment, has an ordering client apparatus 108 and may be any device capable of sending customer data to a computer 102 over a network 114. For example, the electronic device 106 may be a laptop or a desktop computer. In another example, the electronic device 106 may be a tablet. Alternatively, the electronic device 106 may be a smartphone. The ordering client apparatus 108 is described in more detail with respect to the apparatus 400 in FIG. 4 and the apparatus 500 in FIG. 5.

The network 114 may include a local area network ("LAN"), a wide area network ("WAN"), wireless network, cellular network, the Internet, a fiber optic network, or the like. In one embodiment, the network 114 includes multiple networks. For example, the network 114 may include a cellular network along with another network capable Internet connection. In another example, the network 114 includes a wireless network along with a wired network. The network 114 may include switches, routers, servers, cabling and other equipment known to those in the art. The server 110 may be any computer accessible by a computer 102 over a network 114, including but not limited to a database server, a mainframe server, a workstation, a desktop computer, etc.

In one embodiment, a customer billing profile 112 for one or more customers is stored on the server 110 before it is accessed by the order processing apparatus 104. The server 110, in one embodiment, is a computer system external to a computer system available to a merchant, customer service representative of the merchant and/or an automated attendant of the merchant. In one embodiment, the automated attendant of the merchant includes an electronic system that receives voice commands from the customer and/or selections from the customer made by pressing buttons on an electronic device 106 used by the customer for the telephonic connection, and the automated attendant responds with automated voice responses. The automated attendant may allow voice commands, commands entered by pressing buttons, etc. and may respond with audible responses. The audible responses are stored electronically. The automated attendant typically includes automated responses rather than responses from a live customer service representative, although a live customer service representative may be connected under certain circumstances, such as the customer having difficulty, a customer preferring to talk to a customer service representative, a customer desiring information not available through the automated attendant, etc.

A customer billing profile 112 typically contains billing information for a customer. The customer billing profile 112 may include the customer's credit card profile, debit card profile, financial institution account profile, etc. A credit card profile may include account information for one or more credit cards, where the account information includes information such as the credit card account number, the credit card expiration date, the credit card security code, and the credit card billing address. A debit card profile may include account information for one or more debit cards (including prepaid debit cards), where the account information may include information such as the debit card account number, the debit card expiration date, the debit card security code, and/or the debit card personal identification number ("PIN"). A financial institution may be a bank, a credit union, a trust company, etc. A financial institution account profile may include account information for one or more financial institution accounts, where the account information may include the financial institution account number, routing transit number, or other account information.

A customer billing profile 112 may also include additional information of the customer. For example, the customer billing profile 112 may include a shipping address, a residential address, a business address, a phone number, a fax number, an email address of the customer, purchase history, shipping preferences, account information, or other information that would be useful in completing a transaction, signing up for a service or other transaction initiated with a phone call. Throughout the pages of the present disclosure, items, packets, or fields of information about the customer, or any other commands, requests, confirmations, approvals, etc., that are communicated electronically between a customer and a merchant may be encrypted or have other security mechanisms and may be referred to as "tokens." In one embodiment, a token may be transmitted via a telephonic connection. In another embodiment, a token may be transmitted via a data channel in conjunction with the telephonic connection. A token, in one embodiment, is a non-decryptable piece of data to represent, by reference, sensitive or secret data. For example, a token may be used to reference personally identifiable information of the customer stored on a secure computer and accessed using the token.

Figure 1B:
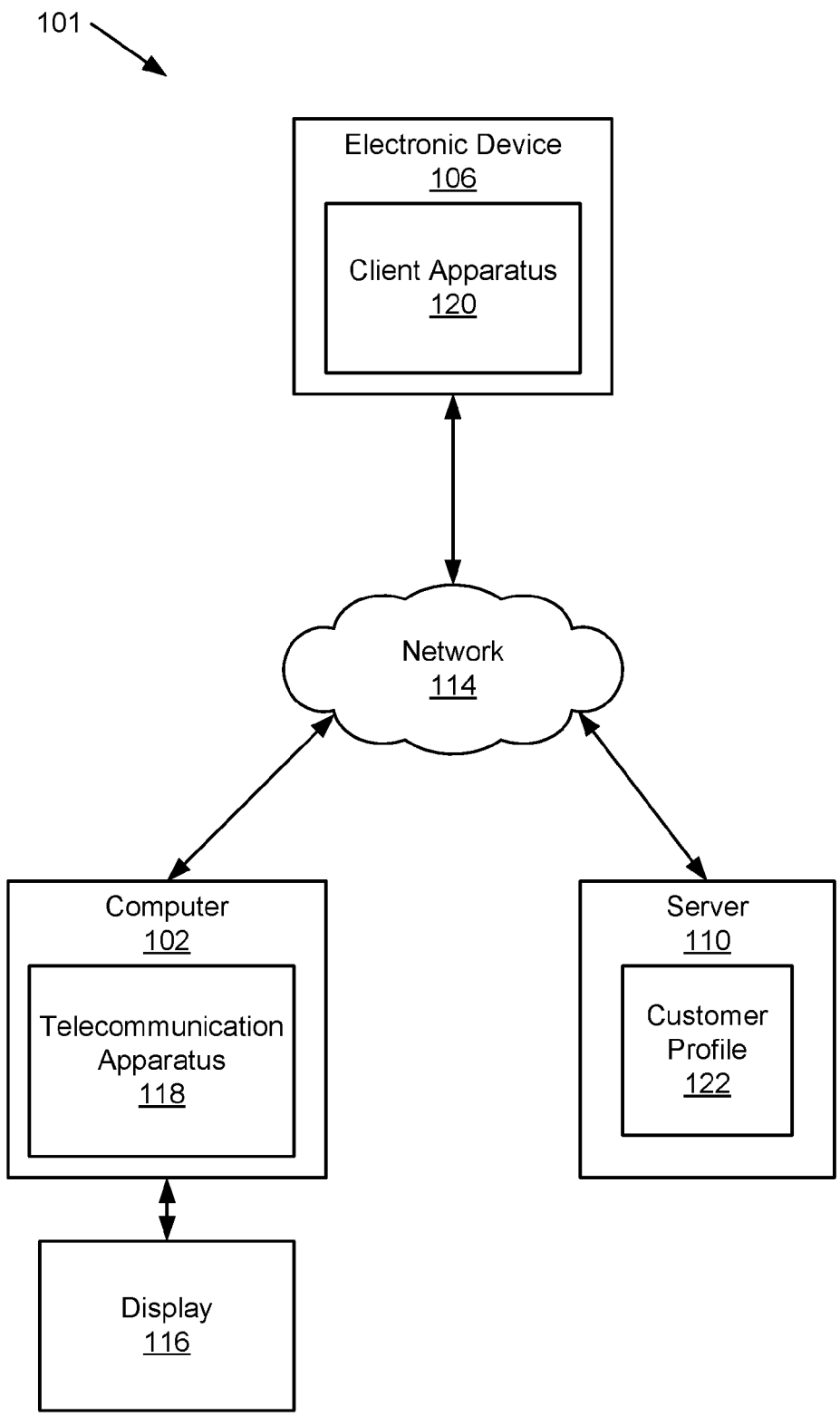
FIG. 1B is a schematic block diagram illustrating one embodiment of a system for providing sensitive information while a consumer is connected via a telephone.

FIG. 1B is a schematic block diagram illustrating one embodiment of a system 101 for providing sensitive information while a consumer is connected via a telephone. The system 101, in one embodiment, includes a computer 102, an electronic device 106, a server 110, a network 114, and a display 116, which are substantially similar to those described above in relation to the system 100 of FIG. 1A. The system 101, in various embodiments, may also include a telecommunication apparatus 118 in the computer 102, a client apparatus 120 in the electronic device 106, and a customer profile 122 on the server 110, which are described below.

In one embodiment, the system 101 includes a telecommunication apparatus 118 that confirms identification of a customer and/or receives sensitive information from the customer during a telephone connection with the customer where the sensitive information is transmitted from the customer profile 122 electronically over the network 114. Typically, the sensitive information is received by the telecommunication apparatus 118 in such a way that the sensitive information is unavailable to a customer service representative of a company in telephone communication with the customer. In addition, the customer may confirm identification and an identification confirmation is sent to the telecommunication apparatus 118 without transmitting sensitive information about the customer to the computer 102 or to the customer service representative. The customer service representative may receive notice of the confirmation of identification and/or that the sensitive information is received by the telecommunication apparatus 118.

The client apparatus 120, in one embodiment, inputs identifying information via the electronic device 106 which is compared to stored identifying information in the customer profile 122 and, in another embodiment, initiates transfer of the sensitive information to the telecommunication apparatus 118, for example by providing approval, by transmitting the sensitive information, etc. In one embodiment, the customer profile 122 is stored on the electronic device 106. The telecommunication apparatus 118, the client apparatus 120, and the customer profile 122 are described in more detail below.

Figure 2:
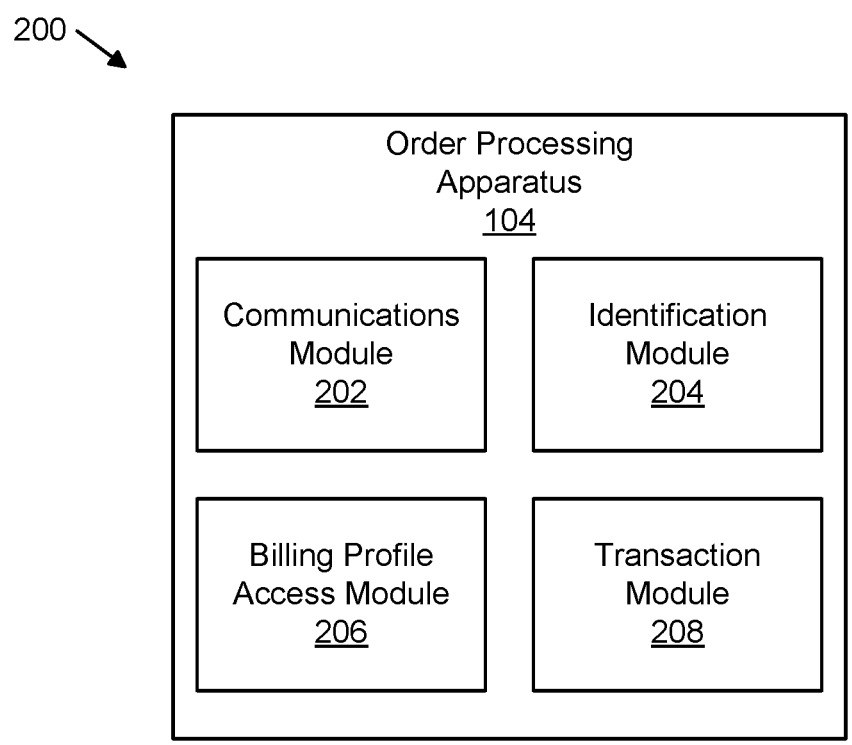
FIG. 2 is a schematic block diagram illustrating one embodiment of an apparatus for processing telephone orders.

FIG. 2 is a schematic block diagram illustrating one embodiment of an apparatus 200 for processing telephone orders. The apparatus 200 includes one embodiment of an order processing apparatus 104 with a communications module 202, an identification module 204, a billing profile access module 206, and a transaction module 208, which are described below.

The communications module 202, in one embodiment, establishes a telephonic connection between a customer service representative of a merchant and a customer or between an automated attendant of a merchant and the customer. The communications module 202 may establish the telephonic connection in response to a connection request from an electronic device 106 used by a customer or by sending a connection request to an electronic device 106 used by a customer. In one form, the telephonic connection is a fixed line connection established over a public switched telephone network ("PSTN") and may include a wired phone or a wireless handset connection to a base. In another form, the telephonic connection is a wireless connection established over a cellular network. In another embodiment, the telephonic connection is an internet protocol ("IP") based connection established over IP networks such as the Internet or voice-over-IP ("VOIP"). As another example, the telephonic connection is part of an audiovisual connection established over the Internet. The telephonic connection may also be an exchange of Short Message Service ("SMS") messages. The telephonic connection may be any connection where a customer may talk to a customer service representative.

In one embodiment, the identification module 204 receives an identifier from an electronic device 106 alerting the customer service representative, automated attendant and/or a computer system of a merchant that a customer has a customer billing profile 112. In this embodiment, the customer billing profile 112 was stored previous to the establishment of the telephonic connection. In one embodiment, the identifier is in a form that allows a customer to be associated with a customer billing profile 112. For example, the identifier may be a combination of letters, numbers, or both. In another example, the identifier may be a picture, photograph, sound, etc. The identifier, in yet another embodiment, may be a hyperlink reference that allows access to a customer billing profile 112, for example in the form of a token. In one embodiment, the identifier is transmitted over a data channel of the telephonic connection. In another embodiment, the identifier is transmitted over a different communication or data channel than the telephonic connection.

For example, the identifier may be transmitted via an internet connection on a device separate from the electronic device 106. In another embodiment, the identifier may be transmitted via an internet and/or cellular connection to the same electronic device 106 that has the telephonic connection. In other words, a customer may use a smartphone to establish both the telephonic connection, for communicating orally with a customer service representative or communicating with an automated attendant, and a data channel of the telephonic connection, for transmitting the identifier, customer billing profile 112, customer approval, etc. using data files, tokens or other means known to those of skill in the art. The identification module 204, in another embodiment, transmits the customer billing profile 112 along with the identifier. In a further embodiment, the identification module 204 notifies the customer service representative or automated attendant of the identifier when the communications module 202 establishes the telephonic connection between a customer and a customer service representative or automated attendant. In another embodiment, the identification module 204 notifies the customer service representative or automated attendant at a later time or, for example, in response to an inquiry by the customer service representative or automated attendant. For instance, the customer service representative or automated attendant may access a service that notifies the customer service representative or automated attendant that the customer has an identifier or may transmit a request to the electronic device 106 to request the identifier and the identification module 204 sends the identifier in response to the request.

The billing profile access module 206, in one embodiment, receives electronic access to a customer billing profile 112. In one embodiment, the billing profile access module 206 receives electronic access to a customer billing profile 112 by sending at least a portion of the identifier for a customer to the server 110, which may use the identifier information to locate the customer billing profile 112 associated with the identifier. The identifier may provide access so that the billing profile access module 206 may read information in the customer billing profile 112, may retrieve one or more files from the server 110 with the customer billing profile 112, the identifier may include a command for the server to send the customer billing profile 112, etc. In another embodiment, the billing profile access module 206 receives electronic access to the customer billing profile 112 by receiving the customer billing profile 112. For example, the electronic device 106 may send the customer billing profile 112. The electronic device 106 may receive the customer billing profile 112 from the server 110 or may store the customer billing profile 112. In another embodiment, the electronic device 106 sends a request to the server 110 to send the customer billing profile 112 to the merchant, customer service representative, and/or automated attendant. One of skill in the art will recognize other ways that the billing profile access module 206 may receive electronic access to the customer billing profile 112.

In another embodiment, the billing profile access module 206 receives electronic access to a customer billing profile 112 in response to an action by the customer that approves sending the customer billing profile 112 to the billing profile access module 206. The action by the customer may be an act by the customer to sending the customer billing profile 112 during the telephonic connection. In a different embodiment, the action by the customer may be a default setting that provides permission to send the customer billing profile 112 in response to a telephonic connection with a customer service representative or automated attendant in which the identifier is sent. Furthermore, the action by the customer may be approving the sales order. The billing profile access module 206, in one form, receives electronic access to a customer billing profile 112 by receiving the customer billing profile 112 from a third party storing the customer billing profile 112. In another form, the billing profile access module 206 receives electronic access to the customer billing profile 112 by receiving a location or an address (e.g., hyperlink) of the customer billing profile 112. In yet another form, the billing profile access module 206 receives electronic access to the customer billing profile 112 by being granted access to retrieve the customer billing profile 112. In a further form, the billing profile access module 206 receives the customer billing profile 112 from the electronic device 106 that transmits the identifier.

The transaction module 208, in one embodiment, processes a sales order using a customer billing profile 112. The sales order may be for one or more products, services, or a combination of products and services offered by a merchant. In one embodiment, the transaction module 208 processes a sales order using a customer billing profile 112 in response to a customer approval of the sales order. During the processing of the sales order by the transaction module 208, the billing information of the customer billing profile 112 is unavailable for viewing by the customer sales representative. For example, where the customer is talking with the customer sales representative, the customer billing profile 112 may be sent electronically so the customer service representative does not see the customer billing profile 112. Where the customer is interfacing with an automated attendant, the customer billing profile 112 may be transmitted in a form that is not viewable by customer sales representatives and other personnel of the merchant. For example, the customer sales representative or other personnel would be unable to view a credit card number, credit card expiration date, or credit card security code. As another example, the customer sales representative or other personnel would be unable to view a financial institution account number or routing transit number. Shielding the billing information of the customer billing profile 112 from the view of a customer sales representative and other personnel of the merchant enhances security by limiting the number of people who have access to the billing information.

Figure 3:
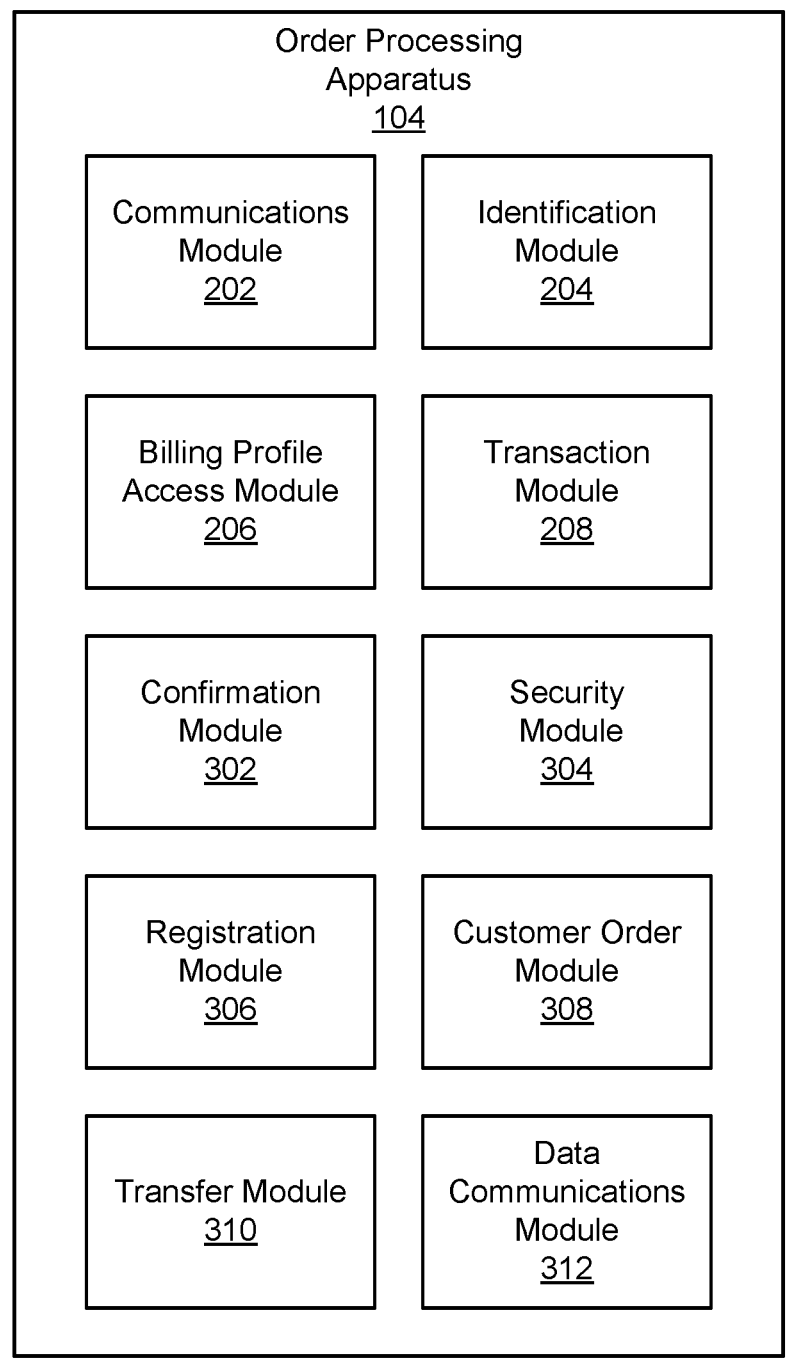
FIG. 3 is a schematic block diagram illustrating another embodiment of an apparatus for processing telephone orders.

FIG. 3 is a schematic block diagram illustrating another embodiment of an apparatus 300 for processing telephone orders. The apparatus 300 includes one embodiment of an order processing apparatus 104 with a communications module 202, an identification module 204, a billing profile access module 206, a transaction module 208, a confirmation module 302, a security module 304, a registration module 306, a customer order module 308, a transfer module 310, and a data communications module 312, which are described below.

The communications module 202, identification module 204, billing profile access module 206, and transaction module 208 in FIG. 3 are substantially similar to the modules described above with respect to the apparatus 200 in FIG. 2. The confirmation module 302, in one embodiment, receives a customer approval of the sales order prior to the processing of the order. For example, the confirmation module 302 may transmit an order approval request to a customer prior to receiving the customer approval. The order approval request may include information about the sales order, such as a final price of the sales order, a description of a product or service being purchased, a price of a product or service being purchased, or the quantity of a product or service being purchased. In another embodiment, the confirmation module receives an electronic message containing the customer approval. The customer approval may take many forms. As an example, the customer approval may be oral consent received over via a telephonic connection. In another example, the customer approval may be a signature, a password, or a personal identification number ("PIN").

The customer approval, in another form, may be a biometric attribute of the customer (e.g., fingerprint, palm print, voice or other biometric information). The tokens, as briefly described above, may be transmitted from the customer to the merchant via a non-telephonic connection, such as the internet, cellular connection, etc. For example, a customer may use a smartphone to establish both the telephonic connection, for communicating verbally with a customer service representative, and the non-telephonic connection, (e.g., cellular connection, internet connection, etc.) for transmitting the approval and/or other tokens. In another example, the customer approval may be a reply to the order approval request. The reply may be text, a check box on the order approval request, a PIN, etc.

The security module 304 verifies the customer approval of the sales order by matching the customer approval with a sample previously provided by the customer. For example, the security module 304 may verify a customer's signature by comparing it to a signature previously provided by the customer and stored on the server 110. In another example, the security module 304 may verify a customer's fingerprint by sending it to the server 110, where it may be compared to a fingerprint previously provided by the customer, and receives the result of the comparison. In this example, by sending the customer approval to the server 110 for comparison, the comparison may enhance security by limiting access to an original and authentic customer approval previously provided by the customer.

The registration module 306, in one embodiment, receives and stores a customer billing profile 112 of a customer. In one embodiment, the registration module 306 receives and stores a customer billing profile 112 in a transaction unrelated to a sales order. For example, the registration module 306 may receive and store the customer billing profile 112 while signing the customer up for a service, for example, with a company independent of the merchant of the customer service representative or automated attendant. In another embodiment, the registration module 306 operates without the involvement of a merchant. For example, without involvement of a merchant associated with the customer service representative. In this embodiment, the merchant typically has no control over and is independent from the registration module 306 when it receives and stores a customer billing profile 112.

The merchant, in the embodiment, may have no control over the customer billing profile 112, except for processing the sales order after receiving the identifier. The registration module 306, in one form, stores the customer billing profile 112 in a location accessible to the electronic device 106. For example, the registration module 306 may store the customer billing profile 112 on a computer 102 or a server 110 that may be accessed by the customer service representative, automated attendant, and/or the computer 102. Once again, any tokens (encrypted or secure information sent electronically from customer to merchant) may be transmitted via the telephonic connection or a non-telephonic connection. For example, the registration module 306 may receive tokens of information in order to establish the customer billing profile 112 via a non-telephonic connection. The telephonic connection and the non-telephonic connection, in one embodiment, may be managed by the same electronic device 106 (i.e., a smartphone may establish both a telephone connection and an internet/data connection).

In one embodiment, the apparatus 300 includes a customer order module 308 that receives, through the automated attendant, information to identify one or more of products and services of the sales order. For example, the customer order module 308 may allow a customer to use voice commands to identify products or services for purchase or may identify a previously stored order. In another example, the customer order module 308 may receive input from the electronic device 106 in the form of button presses, text input, keyboard strokes, etc. In another example, the customer order module 308 may include one or more menus and the customer may interface with the menus over the telephonic connection to identify a product or service to purchase. The customer order module 308, in one embodiment, provides audible responses to selections by the customer to facilitate navigation of menus, verification of a selected product or service, instructions to the customer, etc. One of skill in the art will recognize other features of a customer order module 308 to receive information through the automated attendant to identify a product or service to put in the sales order for purchase by the customer.

In another embodiment, the apparatus 300 includes a transfer module 310 that transfers the telephonic connection to a customer sales representative of the merchant to receive customer billing and shipping information in response to establishing the telephonic connection and not receiving the identifier. For example, the transfer module 310 may be useful for customers without a customer billing profile 112. As mentioned above, an automated attendant may have difficulty with accurately receiving billing and shipping information from a customer. For example, the automated attendant may not be able to discern the difference between certain names or sounds. For example, the automated attendant may have difficulty determining that a proper spelling is Steven or Stephen, or determining that a proper spelling is Brian or Bryan. Therefore, if no identifier is received, the transfer module 310 may transfer the customer to a customer service representative to receive billing and shipping information.

In another embodiment, the apparatus 300 includes a data communications module 312 that establishes a data connection, in conjunction with the telephonic connection, between the merchant and the customer. For example, the data connection may be different than the telephonic connection. In one embodiment, the customer may establish the data connection through a computing device and the telephonic connection through a telephone. In another embodiment, the data connection and the telephonic connection are established using a single electronic device 106 of the customer. For example, the electronic device 106 may be a smartphone that combines voice and data on one cellular connection.

Figure 4:
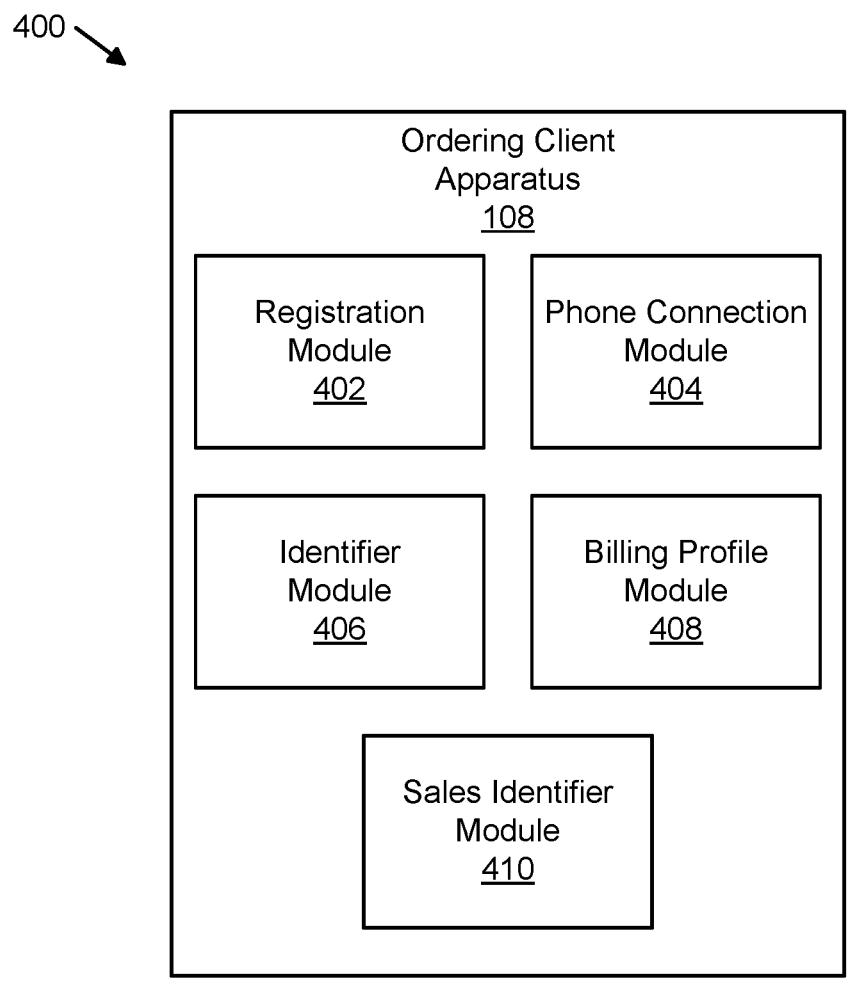
FIG. 4 is a schematic block diagram illustrating one embodiment of an apparatus for placing telephone orders.

FIG. 4 is a schematic block diagram illustrating one embodiment of an apparatus 400 for placing telephone orders. The apparatus 400 includes one embodiment of an ordering client apparatus 108 with a registration module 402, a phone connection module 404, an identifier module 406, a billing profile module 408, and a sales identifier module 410, which are described below.

In one embodiment, the registration module 402 in FIG. 4 is substantially similar to the registration module 306 in FIG. 3. In another embodiment, the registration module 402 creates and stores a customer billing profile 112 of a customer. The registration module 402, in an embodiment, creates and stores a customer billing profile 112 on the electronic device 106. In a further embodiment, the registration module 402 creates and stores a customer billing profile 112 in a location accessible to the electronic device 106. For example, the registration module 402 may create and store the customer billing profile 112 on a computer or a server 110.

The registration module 402, in one embodiment, is web-based. In another embodiment, the registration module 402 allows a third party, such as a representative of a company that stores customer billing profiles 112 to receive information over the phone from the customer and to enter the customer billing profile 112. The company may be a company that establishes a service with merchants for providing services or systems in conjunction with the embodiments described herein. Customers and/or merchants may desire such a service/system for enhanced security, in that the customer service representative or other employees of merchants do not view the sensitive customer billing profile 112 of the customer and sales transactions may take less time than traditional methods where customers relay sensitive financial and personal information over a phone to a customer service representative or automated attendant.

The phone connection module 404, in one embodiment, establishes a telephonic connection between a customer and a merchant customer service representative. In one embodiment, the phone connection module 404 establishes a telephonic connection between an electronic device 106 of a customer and the customer service representative. In another embodiment, the phone connection module 404 establishes a telephonic connection between an electronic device 106 of a customer and an automated attendant of a merchant. The telephonic connection is substantially similar to the telephonic connection previously described in relation to the apparatuses 200, 300 of FIGS. 2 and 3.

The identifier module 406, in one embodiment, sends an identifier to a customer service representative or to an automated attendant in response to the phone connection module 404 establishing a telephonic connection between a customer and the customer service representative or automated attendant. The identifier links the customer to a customer billing profile 112. In one embodiment, the identifier module 406 sends the identifier in a communication channel of the telephonic connection. In another embodiment, the identifier module 406 sends the identifier in a communication channel separate from the telephonic connection. The identifier is substantially similar to the identifier described above in relation to the apparatuses 200, 300 of FIGS. 2 and 3. In one embodiment, the electronic device 106 can be used to establish the telephonic connection and send the identifier. For example, the electronic device 106 may be a smartphone with an application that enables oral phone calls over the telephonic connection and sending information, for example as tokens, over the data channel connection. Other electronic devices 106, such as a tablet computer, a laptop or desktop computer, etc. may also be used to make the data channel connection. In another embodiment, one electronic device 106 establishes the telephonic connection and another electronic device 106 sends the identifier. Thus, a customer may be on a telephone in front of a computer.

The billing profile module 408, in one embodiment, provides the customer service representative or automated attendant electronic access to the customer billing profile 112 of the customer. In one embodiment, the billing profile module 408 is substantially similar to the billing profile access module 206 in FIG. 3. In another embodiment, the billing profile module 408 transmits the customer billing profile 112 of a customer from the electronic device 106 to the billing profile access module 206 to be accessible to customer service representative. The customer service representative or automated attendant may then use the customer billing profile 112 to process the sales order for the customer, where the customer billing profile 112 is unavailable for viewing by the customer service representative or other person associated with the merchant.

In one embodiment, where the customer establishes a connection with an automated attendant, the apparatus 400 includes a sales identifier module 410 that identifies to the automated attendant a product and/or a service offered by the merchant and desired by the customer for purchase as part of a sales order. For example, the sales identifier module 410 may be integral with the automated attendant and may include menus, instructions, etc. to allow the customer to identify products or services of the merchant or previously identified and already in a sales order. For instance the sales identifier module 410 may allow the customer to navigate to particular products or services of the merchant or may allow the customer to access a previously stored sales order or partial sales order. Once the sales identifier module 410 has allowed the customer to identify goods or services to be part of the sales order, the billing profile module 408 may then process the sales order using the customer billing profile 112. In another embodiment, the sales identifier module 410 may be used with a customer service representative to identify products and/or services of the merchant for the sales order.

Figure 5:
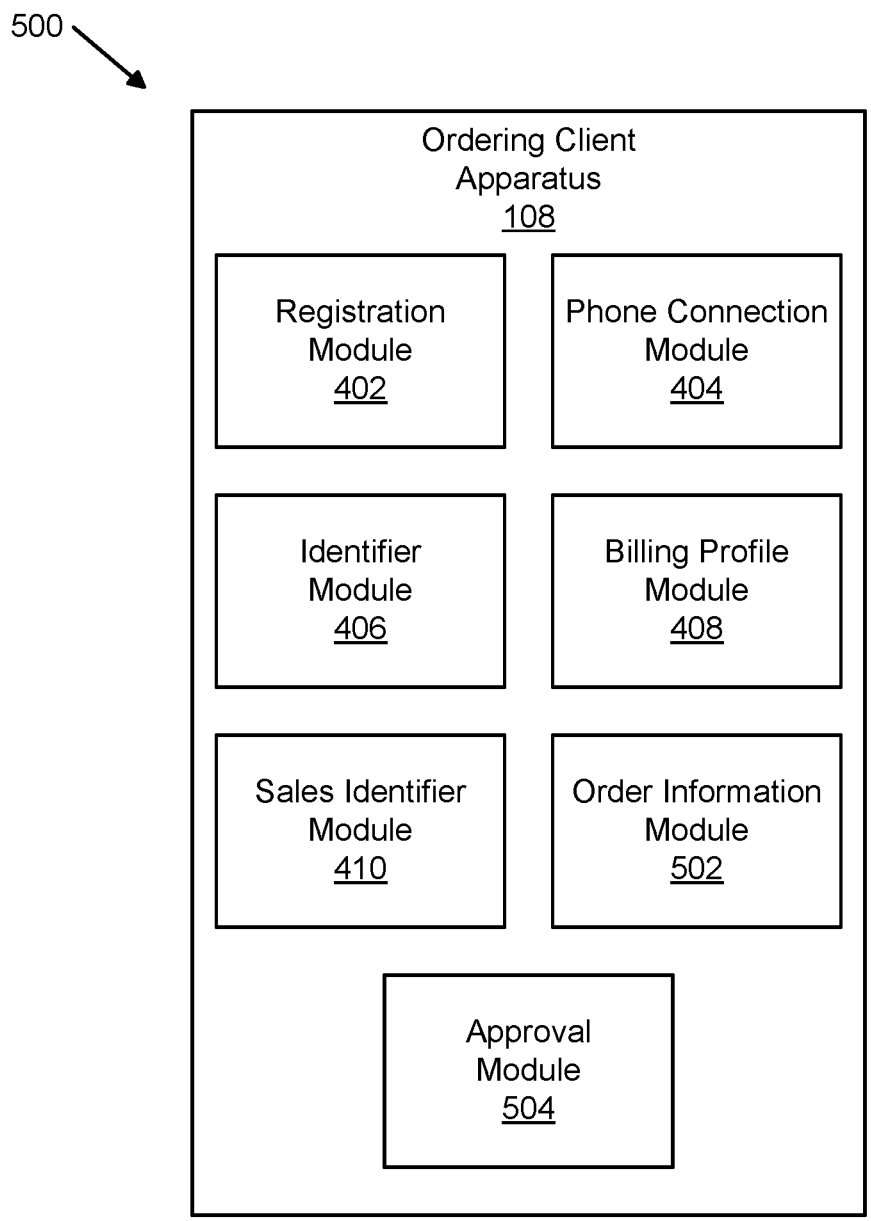
FIG. 5 is a schematic block diagram illustrating another embodiment of an apparatus for placing telephone orders.

FIG. 5 is a schematic block diagram illustrating another embodiment of an apparatus 500 for placing telephone orders. The apparatus 500 includes one embodiment of an ordering client apparatus 108 with a registration module 402, a phone connection module 404, an identifier module 406, a billing profile module 408, a sales identifier module 410, an order information module 502, and an approval module 504, which are described below.

The registration module 402, phone connection module 404, identifier module 406, billing profile module 408 and sales identifier module 410 in FIG. 5, in one embodiment, are substantially similar to the modules previously described with respect to the ordering client apparatus 108 of FIG. 4. The order information module 502, in one embodiment, receives sales order information from the customer service representative. The sales order information may include a description of the order placed by the customer, or other information related to a sales transaction. In one form, the sales order information may include a description of a product or service being purchased, a price of a product or service being purchased, the quantity of a product or service being purchased, etc. In another embodiment, the order information module 502 may interact with the sales identifier module 410 to receive product/service sales order information or may include functions of the sales identifier module 410.

In one embodiment, the approval module 504 sends a customer approval of a sales order to a customer service representative or to an automated attendant. The customer approval may take many forms. As an example, the customer approval may be verbal consent. In another example, the customer approval may be a signature, a password, or a personal identification number ("PIN"). The customer approval, in another form, may be a biometric attribute of the customer (e.g., fingerprint, palm print, voice or other biometric information). The customer approval may be in the form of tokens, as briefly described above, and may be transmitted from the customer to the merchant via a data channel connection in conjunction with the telephonic connection, such as the internet, cellular network, etc. For example, a customer may use a smartphone to establish both the telephonic connection, for communicating orally with a customer service representative, and the data channel connection, (e.g., internet connection, cellular network, etc.) for transmitting the approval and/or other tokens. In another embodiment, the customer approval may be a reply to the sales order information received by the order information module 502 and/or sales identifier module 410. The reply may be in the form of text, a checked checkbox, a PIN, a digital signature, etc.

In one embodiment, instead of establishing a telephonic connection with a customer service representative, the various modules of the present disclosure may establish a telephonic connection with an automated attendant. In such embodiments, the automated attendant may 'communicate' orally with the customer and in order receive the various tokens (e.g., identifier, customer billing profile 112, etc.). The automated attendant may incorporate speech recognition software and thus may communicate with and receive tokens from the customer. However, in certain situations and with certain information, the automated attendant may struggle to accurately comprehend the oral communication with the customer. For example, the automated attendant may struggle to accurately convert the customer's speech into text. In such situations, the automated attendant may still receive the customer billing profile 112 from the customer via a telephonic connection by instructing the customer to manually enter any passwords using the key-pad on their electronic device 106 or may receive the customer billing profile 112 without specific instructions from the customer, such as when the customer billing profile 112 is sent or enabled with the identifier.

However, transmitting information by using speech recognition software or by requiring the customer to manually enter the tokens using a 10 digit key-pad may be inefficient. Accordingly, in certain embodiments, the various modules of the present disclosure also establish a data channel in conjunction with the telephonic connection. The establishment of a data channel (e.g., internet) allows customers to easily and efficiently transmit the identifier, the customer billing profile 112, etc., possibly in the form of tokens, to merchants. For example, a customer may use a single electronic device 106 (e.g. a smartphone) to establish both the telephonic connection, for communicating orally with an automated attendant, and the data channel of the telephonic connection, for entering and transmitting the identifier, customer billing profile 112, etc. In another embodiment, the customer may use two separate devices (e.g., a phone and a computer) to establish both the telephonic and data channel connections. The data channel connection may utilize a mobile application, a website, executable code on a computer, or other means to allow customers to enter and transmit the identifier, the customer billing profile 112, etc. to a merchant. For example, the various modules of the present disclosure may transmit information to the customer via the telephonic connection and the customer may transmit information/tokens to the various modules via the data channel connection.

Figure 6:
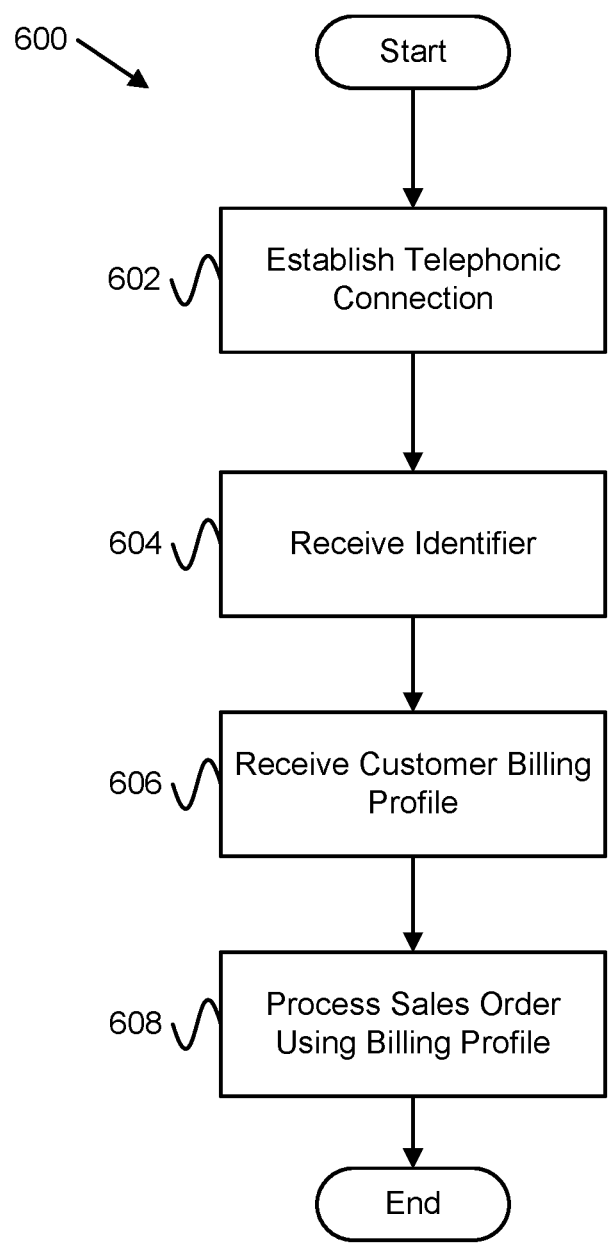
FIG. 6 is a schematic flow chart illustrating one embodiment of a method for processing telephone orders.

FIG. 6 is a schematic flow chart illustrating one embodiment of a method 600 for processing telephone orders. The method 600 begins and establishes 602 a telephonic connection between a customer and a customer service representative of a merchant. In one embodiment, the communications module 202 establishes the telephonic connection. In another embodiment, the phone connection module 404 establishes the telephonic connection. The method 600 receives 604 an identifier alerting the customer service representative, automated attendant, and/or a computer system of a merchant that the customer has a customer billing profile 112. The customer billing profile 112 is stored electronically on a computer system external to a computer system available to the merchant, automated attendant or the customer service representative. In one form, the identification module 204 receives the identifier. The method 600 receives 606 the customer billing profile 112. In one form, the customer billing profile 112 is received by the billing profile access module 206. In another embodiment, the billing profile module 408 sends the customer billing profile 112. The method 600 processes 608 a sales order of the customer using the customer billing profile 112 and method 600 ends. During method 600, the customer billing profile 112 is unavailable for viewing by the customer service representative or person affiliated with the merchant.

Figure 7:
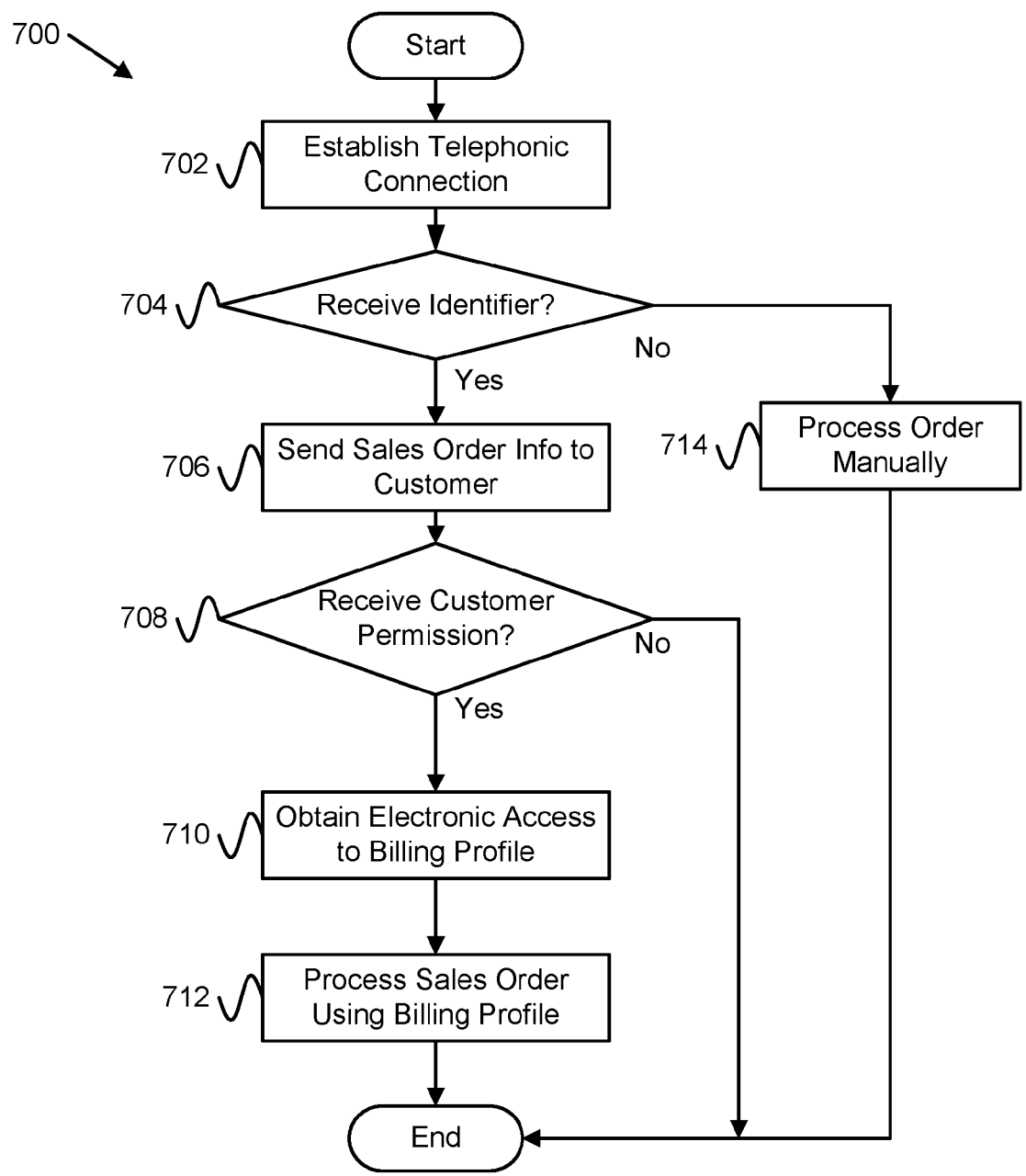
FIG. 7 is a schematic flow chart illustrating another embodiment of a method for processing telephone orders.

FIG. 7 is a schematic flow chart illustrating another embodiment of a method 700 for processing telephone orders. The method 700 begins and establishes 702 a telephonic connection between a customer and a customer representative or automated attendant of a merchant. In one embodiment, the communications module 202 establishes the telephonic connection. In another embodiment, the phone connection module 404 establishes the telephonic connection. The method 700 determines 704 if an identifier linking a customer to a customer billing profile 112 has been received. If no identifier for the customer has been received, the method 700 processes 714 the sales order of a customer manually and the method 700 ends. In one embodiment where the telephonic connection is to an automated attendant, processing manually may include transferring the call to a customer service representative, for example using the transfer module 310. If the method 700 determines 704 that an identifier has been received, the method 700 sends 706 the sales order information to the customer. In one embodiment, the identification module 204 determines 704 if the identifier has been received.

The method 700 determines 708 whether customer permission has been received. In one form, customer permission may be an action by the customer to send the customer billing profile 112 during the telephonic connection. Customer permission, in another form, can be a default setting that provides permission to send the customer billing profile 112 in response to a telephonic connection with a customer service representative or automated attendant in which the identifier is sent. Another form of customer permission can be a customer approving the sales order. If the method 700 determines 708 that no customer permission for the sales order has been received, the method 700 ends. If the method 700 determines 708 that a customer permission has been received, the method 700 obtains 710 electronic access to the customer billing profile 112 linked to the previously received identifier. In one embodiment, the confirmation module 302 determines 708 if a customer approval is received. In another embodiment, the billing profile module 408 obtains electronic access to the customer billing profile 112. The method 700 processes 712 a sales order of the customer using the customer billing profile 112 and method 700 ends. During method 700, the customer billing profile 112 is unavailable for viewing by the customer service representative or employee of the merchant.

Figure 8:
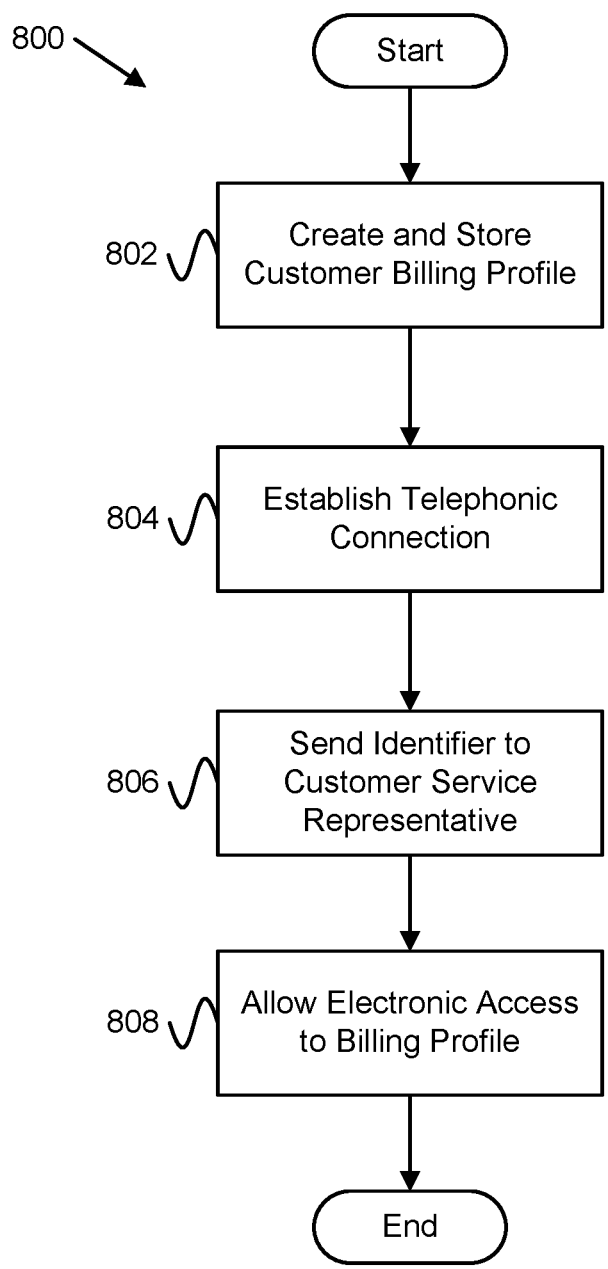
FIG. 8 is a schematic flow chart illustrating one embodiment of a method for placing telephone orders.

FIG. 8 is a schematic flow chart illustrating one embodiment of a method 800 for placing telephone orders. The method 800 begins and creates and stores 802 a customer billing profile 112. In one embodiment, the registration module 402 creates and stores 802 the customer billing profile 112. In another embodiment, the registration module 402 receives and stores the customer billing profile 112 of the customer in a transaction unrelated to the merchant and/or placing a sales order. The method 800 establishes 804 a telephonic connection between a customer and a customer service representative or automated attendant of a merchant. In an embodiment, the phone connection module 404 establishes the telephonic connection. The method 800 sends 806 electronically an identifier to the customer service representative, automated attendant, or computer system of the merchant in response to establishing the telephonic connection, the identifier alerting the customer service representative, automated attendant and/or the computer system of a merchant that the customer has a customer billing profile 112. In one embodiment, the identifier module 406 sends the identifier electronically. The method 800 allows 808 electronic access to the customer billing profile 112 for processing a sales order, and method 800 ends. In one embodiment, the customer service representative processes a sales order of a customer using the customer billing profile 112. During method 800, the customer billing profile 112 is unavailable for viewing by the customer service representative or person connected with the merchant.

Figure 9:
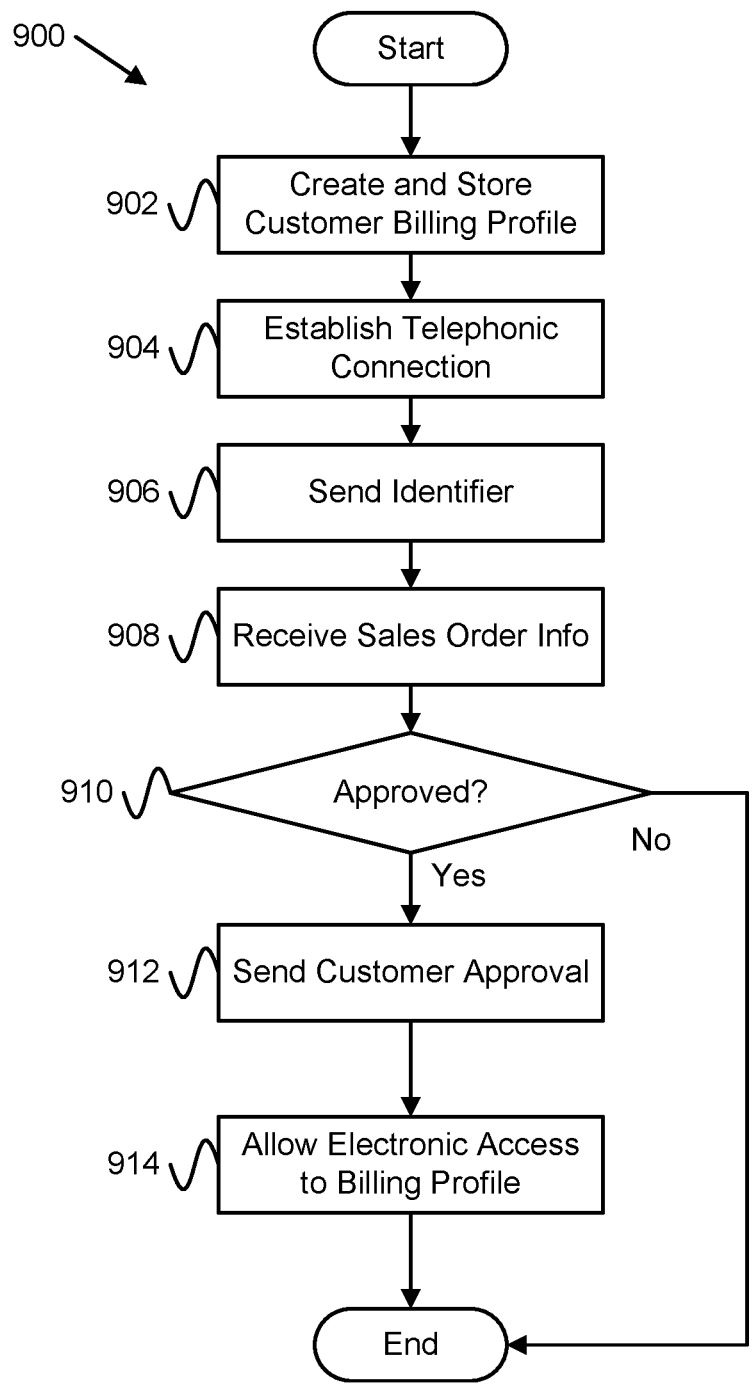
FIG. 9 is a schematic flow chart illustrating another embodiment of a method for processing telephone orders.

FIG. 9 is a schematic flow chart illustrating another embodiment of a method 900 for processing telephone orders. The method 900 begins and creates and stores 902 a customer billing profile 112. In one embodiment, the registration module 402 creates and stores the customer billing profile 112. The method 900 establishes 904 a telephonic connection between a customer and a customer service representative or automated attendant of a merchant. In an embodiment, the phone connection module 404 establishes the telephonic connection. The method 900 sends 906 electronically an identifier to the customer service representative or automated attendant in response to establishing the telephonic connection. The identifier, in one embodiment is a token. The identifier alerts the customer service representative, automated attendant and/or a computer system of a merchant that the customer has a customer billing profile 112. In one embodiment, the identifier module 406 sends the identifier electronically. The method 900 receives 908 sales order information from the customer service representative or automated attendant. In one embodiment, the order information module 502 receives the sales order information. The method 900 determines 910 whether to approve the sales order. If the method 900 determines 910 that the sales order is not approved, the method 900 ends. If the method 900 determines 910 that the sales order is approved, the method 900 sends 912 the approval to the customer service representative. In one embodiment, the approval module 504 sends the customer approval. The method 900 allows 914 electronic access to the customer billing profile 112 linked to the previously sent identifier and method 900 ends. In one embodiment, the billing profile module 408 allows electronic access to the customer billing profile 112. During method 900, the customer billing profile 112 is unavailable for viewing by the customer service representative or person affiliated with the merchant.

Figure 10:
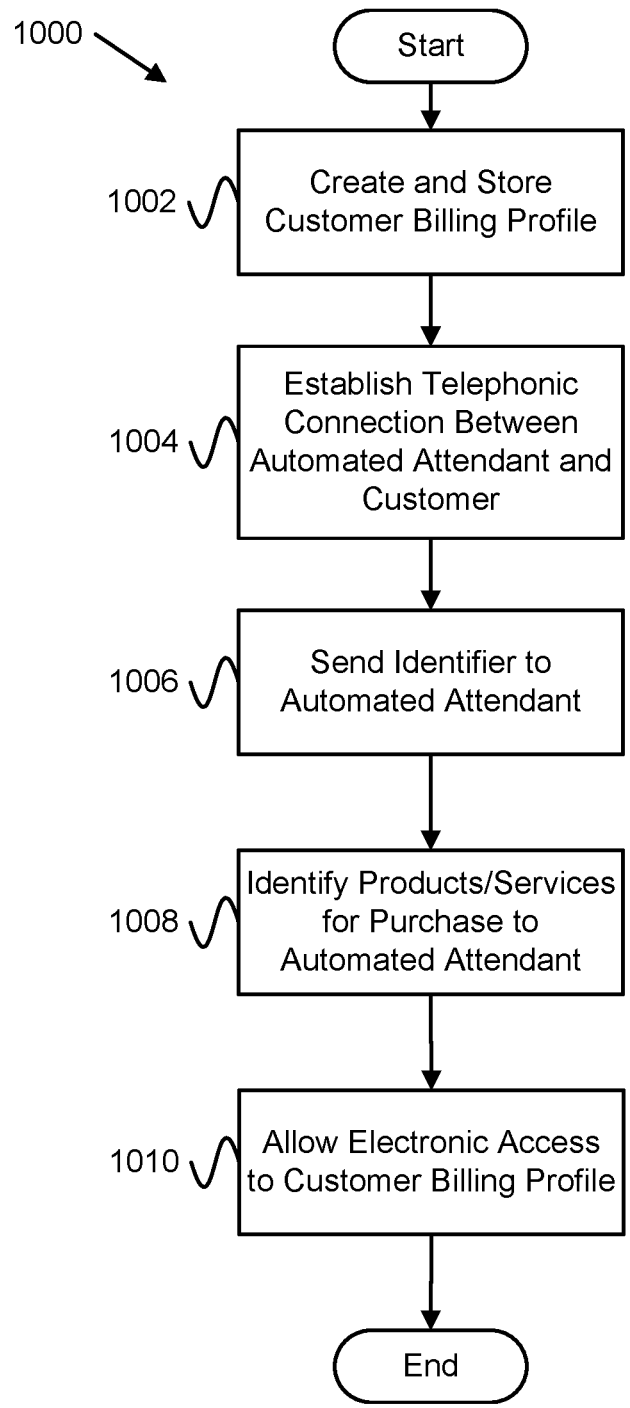
FIG. 10 is a schematic flow chart illustrating another embodiment of a method for placing telephone orders with an automated attendant.

FIG. 10 is a schematic flow chart illustrating another embodiment of a method 1000 for placing telephone orders with an automated attendant. The method 1000 begins and creates 1002 and stores a customer billing profile 112. The method 1000 establishes 1004 a telephonic connection between the customer and an automated attendant of a merchant and sends 1006 an identifier to the automated attendant and/or computer system of the merchant. The method 1000 identifies 1008, to the automated attendant, products and/or services to be included in a sales order and allows 1010 electronic access to the customer billing profile 112 of the customer for processing the sales order, and the method 1000 ends. In one embodiment, the sales identifier module 410 identifies 1008 to the automated attendant the products and/or services of the sales order.

Figure 11:
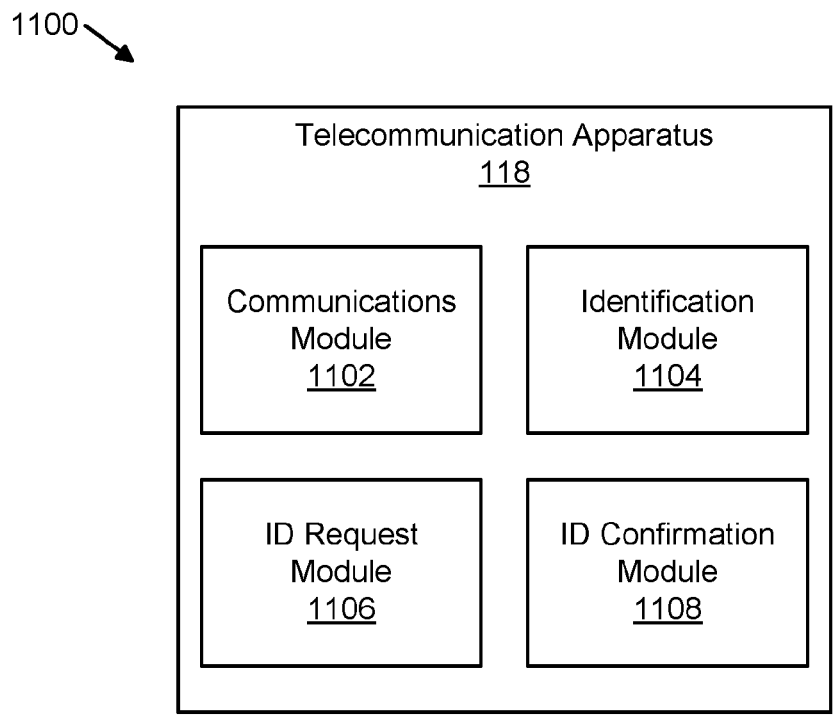
FIG. 11 is a schematic block diagram illustrating an embodiment of an apparatus for confirming identification of a customer.

FIG. 11 is a schematic block diagram illustrating an embodiment of an apparatus 1100 for confirming identification of a customer. The apparatus 1100 includes one embodiment of the telecommunication apparatus 118 that includes a communications module 1102, an identification module 1104, an ID request module 1106, and an ID confirmation module 1108, which are described below.

The apparatus 1100, in one embodiment, includes a communications module 1102 that establishes a telephonic connection between a customer service representative of a company and a customer through an electronic device 106 of the customer. For example, the customer may call the company and the computer 102 of the company may route the call through the telecommunication apparatus 118 to the customer service representative. In another embodiment, the customer service representative calls the customer through the telecommunication apparatus 118. Typically, the telecommunication apparatus 118 is part of or includes a telephone system used by customer service representatives of a company for contacting or receiving calls from a customer. The company may be any group that requires verification of identity and/or to receive sensitive information from a customer. In one embodiment, the company is a merchant and the communications module 1102 is similar to the communications module 202 and the phone connection module 404 described above.

The company may be from the banking industry, the financial industry, the medical industry, from the mortgage or loan industry, the auto industry, from a government entity, a utility, a communications company, an airline, or the like. For example, the company may be an airline and the customer may be making a reservation and the airline may need to verify identity of the customer. The company may be a merchant and the customer may be buying something from the merchant and the merchant may want to verify the identity of the customer, for example if the customer was buying a weapon, medication, etc. where verification of the identity of the customer is important. The company may be medical practice and a medical assistant may need to verify the identity of the customer, which may be a patient, before disclosing confidential information. The company may be a government agency, such as the Internal Revenue Service, and may require verification of identity before proceeding. One of skill in the art will recognize other companies that may require identification of a customer during a telephone connection and discussion with the customer. The company may be an electronics company and the customer may have purchased a product from the company and may be seeking warranty service. The company may need to verify identity before proceeding with the warranty service.

The customer service representative, in one embodiment, is a person that works for the company. In another embodiment, the customer service representative is an employee that is working on behalf of a company where the employer of the customer service representative works for the company and acts on behalf of the company. In another embodiment, the customer service representative is an automated attendant. The customer service representative, in one embodiment, is as described above in relation to the apparatuses 200, 300, 400, 500 of FIGS. 2-5. Often customers are hesitant to provide identifying information to a customer service representative during a telephone conversation over fears that the customer service representative may use the identifying information in an inappropriate way. The telecommunication apparatus 118 and client apparatus 120 provide a mechanism for the customer to verify identity during a phone conversation with a customer service representative of a company in a way that identifying information and sensitive information sent to the company are hidden from the customer service representative. In addition, the telecommunication apparatus 118 and client apparatus 120 provide a way to shorten the identification process and the process of transferring confidential and sensitive information to the company.

In one embodiment, the apparatus 1100 includes an identification module 1104 that receives an identifier. The identifier is received in conjunction with the telephonic connection. The identifier, in one embodiment, alerts the customer service representative and/or a computer system of the company that the customer has a customer profile 122. The customer profile 122 includes information to identify the customer and the customer profile 122 is stored previous to the telephonic connection. In one example, the identifier is sent in connection with establishing the telephonic connection. In another example, the identifier includes a link to the customer profile 122, where the link is operable to access the customer profile 122. In another example, the identifier is sent through an action by the customer and through the electronic device 106. In one embodiment, the action by the customer includes an action by the customer to transmit the information from the customer profile 122 during the telephonic connection. In another embodiment, the action by the customer includes a default setting that provides permission to transmit the information from the customer profile 122 in response to establishing the telephonic connection.

The customer profile 122, in one embodiment includes or is the same as the customer billing profile 112 discussed in relation to the apparatuses 200, 300, 400, 500 of FIGS. 2-5 and may include the information of a customer billing profile 112. For example, the customer profile 122 may include a shipping address, a residential address, a business address, a phone number, a fax number, an email address, a date of birth, a social security number or last four digits of a social security number, a user name, a preference, a mother's maiden name, passwords, family information, security question information, a drivers license, and the like. In addition, the customer profile 122 may include healthcare or medical information, such as a medical history, prescription information, medical records, blood type, and the like, may include financial information, such as account information, loan information, credit information, etc. The customer profile 122 may include any information that may be of a sensitive or a personal nature that a customer may be required to deliver to a company but that the customer may not want a customer service representative to view. In one embodiment, the customer profile 122 includes identifying information that may be used to confirm the identity of the customer. For example, the customer profile 122 may include one or more finger prints, retina scans, passwords, a voice print, and the like. The identifying information, in one embodiment, includes information that may be compared to identifying information input by the customer at a particular time. One of skill in the art will recognize other information that a customer may store in a customer profile 122.

In one embodiment, the apparatus 1100 includes an ID request module 1106 that sends a request to the customer to provide identifying information via the electronic device 106 of the customer, where the identifying information is input to the electronic device 106 by the customer using an electronic, non-verbal technique. An electronic, non-verbal technique includes input through a keyboard, biometric scanner, camera, etc. where the customer does not verbally speak the identifying information to the customer service representative. In one embodiment, the customer profile 122 may include a voiceprint and the electronic, non-verbal technique may be receiving a voiceprint through the microphone of the electronic device 106 where the voiceprint is electronically analyzed and compared with the voiceprint stored in the customer profile 122. One of skill in the art will recognize other ways that a customer may input identifying information through the electronic device 106 without speaking the identifying information to the customer service representative.

In one embodiment, at least a portion of the identifying information input by the customer is masked from the customer service representative. In another embodiment, some or all of the identifying information is not masked and is passed to the customer service representative. For example, identifying information, such as a password or social security number, may be masked from the customer service representative while other identifying information, such as a username, may be passed on to the customer service representative.

In one embodiment, the ID request module 1106 receives a verbal prompt from the customer service representative and relays the verbal prompt as the request. In another embodiment, the ID request module 1106 sends an electronic message asking the customer to input the identifying information. For example, the ID request module 1106 may send a message to the client apparatus 120 to trigger the client apparatus 120 to ask the customer to input the identifying information. The client apparatus 120 may display a message on a display, may activate a fingerprint reader and display instructions, may activate a camera for a retina scan and may display instructions for the retina scan, etc.

The request may ask the customer to provide a particular type of identifying information or may ask the customer to follow certain steps. In another embodiment, the request may be for more than one type of identifying information. For example, the request may be for a password along with a fingerprint scan. In other embodiments, the request may be for other biometric information. In one embodiment, the ID request module 1106 electronically signals the client apparatus 120 and/or electronic device 106 to trigger a request by the client apparatus 120 and/or electronic device 106. In another embodiment, the ID request module 1106 sends a request and the client apparatus 120 and/or electronic device 120 passes on the request. One of skill in the art will recognize other forms of a request to the customer to provide identifying information.

Masking the identifying information from the customer service representative includes hiding, concealing, etc. the identifying information in a way that the identifying information is unavailable to the customer service representative. For example, where the identifying information is a fingerprint, the customer may input a fingerprint using a fingerprint scanner on the electronic device 106 and the customer service representative does not receive the fingerprint and cannot access any fingerprint or other biometric information stored in the customer profile 122. In another example, where the identifying information is a password, the customer may input the password on a keypad of the electronic device 106 without the customer service representative receiving the password or having access to a stored password in the customer profile 122. In the case of a voiceprint, the customer may say a certain phrase that may be analyzed to identify the customer and the customer service representative may not receive audio when the customer is repeating the phrase and may not have access to voice analysis data used to compare to a stored voice print. One of skill in the art will recognize other techniques for masking or concealing identifying information from the customer service representative while being input by the customer or being stored in the customer profile 122.

In one embodiment, the apparatus 1100 includes an ID confirmation module 1108 that receives an identification confirmation in response to the identifying information input by the customer matching the information to identify the customer in the customer profile. The identification confirmation does not include the identifying information, but indicates the match between the identifying information input by the customer and the information to identify the customer in the customer profile. In one embodiment, the client apparatus 120 compares the identifying information input by the customer and the information to identify the customer in the customer profile. In another embodiment, a computer external to the electronic device 106 compares the identifying information input by the customer and the information to identify the customer in the customer profile.

In one embodiment, the device or service that compares the identifying information input by the customer and the information to identify the customer in the customer profile and identifies a match is a trusted source complying with identification requirements of the company. For example, verifying a match between the identifying information input by the customer and the information to identify the customer in the customer profile may be part of a service that authenticates identification that meets security requirements of the company. The service that authenticates identification may comply with government standards, company standards, industry standards, and the like. The service that compares the identifying information input by the customer and the information to identify the customer in the customer profile and authenticates identification of the customer may provide assurances with regard to accuracy or other standards so that the company accepts the identification confirmation without the customer providing the identifying information to the customer service representative.

In one embodiment, the customer profile 122 is stored via a server 110 separate from the electronic device 106 of the customer and the computer system (i.e. computer 102) of the company and the server 110 sends the identification confirmation received by the ID confirmation module 1108. In another embodiment, the customer profile 122 is part of or is accessible to the electronic device 106 and the electronic device 106 sends the identification confirmation.

Figure 12:
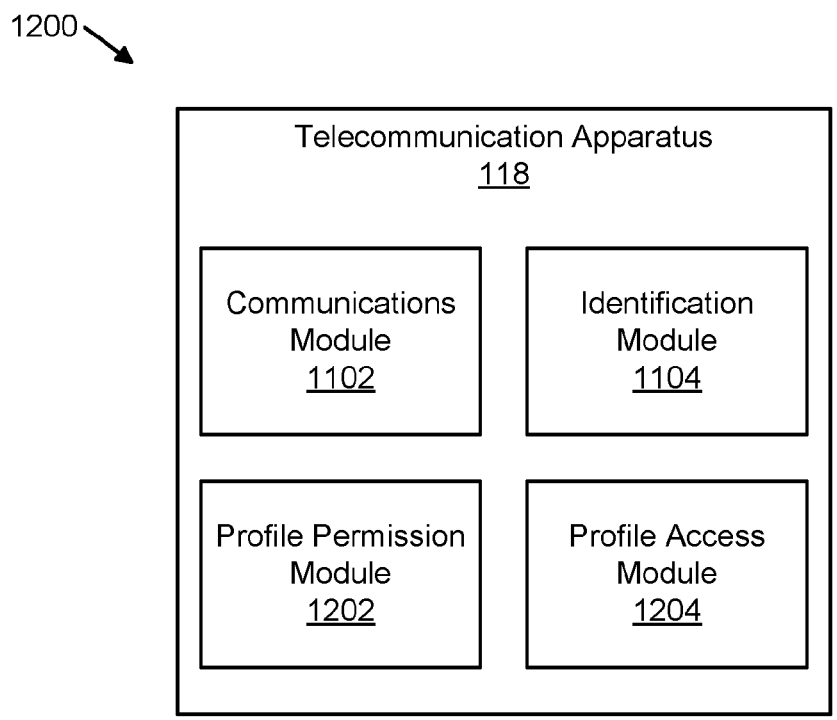
FIG. 12 is a schematic block diagram illustrating an embodiment of an apparatus for receiving sensitive information.

FIG. 12 is a schematic block diagram illustrating an embodiment of an apparatus 1200 for receiving sensitive information. The apparatus 1200 includes another embodiment of the telecommunication apparatus 118 with a communications module 1102 and an identification module 1104 which are substantially similar to those described above in relation to the apparatus 1100 of FIG. 11. The apparatus 1200 also includes a profile permission module 1202 and a profile access module 1204, which are described below.

In one embodiment, the apparatus 1200 includes a profile permission module 1202 that receives electronic access to the customer profile 122. The customer profile 122 includes personal information of the customer, and the customer profile 122 is stored electronically in a computer system external to a computer system (i.e. computer 102) available to the company and to the customer service representative. The profile permission module 1202, in various embodiments, receives electronic access to the customer profile 122 by receiving a link to a location of the customer profile 122, by receiving a password to access the customer profile 122, by receiving a token with information about accessing the customer profile 122, and the like. The computer system storing the customer profile 122 may include a computer external to the electronic device 106, such as the server 110 of the system 101 of FIG. 1B, or may include the electronic device 106. In various embodiments, the profile permission module 1202 is similar to the billing profile access module 206 and/or the billing profile module 408 describe above in relation to the apparatuses 200, 300, 400, 500 of FIGS. 2-5.

The apparatus 1200 includes, in one embodiment, a profile access module 1204 that accesses the customer profile 122 to transmit information from the customer profile 122 to the computer system of the company over a network 114, wherein the transmitted information of the customer profile is unavailable for viewing by the customer service representative. For example, the profile access module 1204 may receive and/or transfer the information from the customer profile 122 to the computer system of the company (i.e. computer 102) without displaying the information from the customer profile 122 on a display 116 accessible to the customer service representative. The computer system of the company may then use the information from the customer profile 122 in a way consistent with a need for receiving the information from the customer profile 122.

For example, where the information is medical information, the computer system of the company, which may be a HIPAA compliant computer, may provide access to the doctor of the customer while blocking access to the information from a medical assistant calling the customer to get the information. In another example, where the customer is seeking an airline reservation and the company is an airline, the profile access module 1204 may access information from the customer profile 122 required for a flight, such as date of birth of the customer, an address, credit card information, etc. and the profile access module 1204 may populate a flight reservation form without a customer service representative of the airline seeing the information.

In one embodiment, the profile access module 1204 accesses the information in the customer profile 122 by downloading the information from the customer profile 122. In another embodiment, the profile access module 1204 accesses the information in the customer profile 122 by receiving the information after a server 110, electronic device 106, etc. transmits the information from the customer profile 122. In one embodiment, the profile permission module 1202 receives electronic access to the customer profile 122 and the profile access module 1204 accesses the customer profile 122 to transmit information from the customer profile 122 in one step. For example, the client apparatus 120 may send the information from the customer profile 122 where the telecommunication apparatus 118 both receives electronic access to the information and accesses the information from the customer profile 122.

In one embodiment, the profile permission module 1202 receives electronic access to the customer profile 122 and the profile access module 1204 accesses the customer profile 122 to transmit information from the customer profile 122 after an action by the customer. For example, the customer may press a button on a display of the electronic device 106 authorizing access, may enter a code, a fingerprint or other biometric information, a retina scan, etc. In another embodiment, the client apparatus 120 automatically provides permission to access the information in the customer profile 122 after an authentication process.

In one embodiment, the customer service representative establishes the telephonic connection and receives the identifier through a display interface of a customer service application running on a computer accessible to the customer service representative (i.e. computer 102) and where the application receives electronic access to the customer profile 122 and accesses the customer profile 122 to transmit information from the customer profile 122. The application utilizes the information from the customer profile 122 without displaying the information from the customer profile 122 to the customer service representative. In one embodiment, the telecommunication apparatus 118 includes the application. The telecommunication apparatus 118 differs from other systems that independently establish a telephonic connection and send data by integrating sensitive data transfer with a phone call between the customer and the customer service representative in a way that the sensitive information is masked from the customer service representative.

Figure 13:
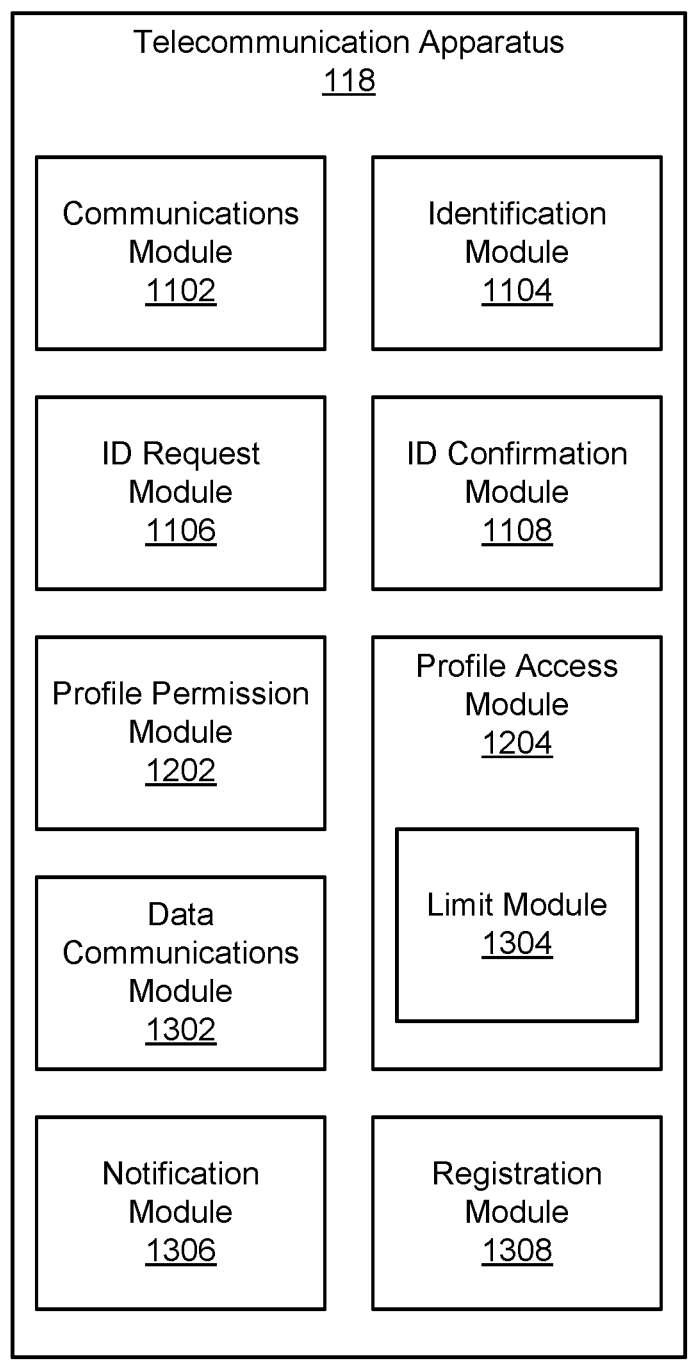
FIG. 13 is a schematic block diagram illustrating an embodiment of an apparatus for confirming identification of a customer and receiving sensitive information.

FIG. 13 is a schematic block diagram illustrating an embodiment of an apparatus 1300 for confirming identification of a customer and receiving sensitive information. The apparatus 1300 includes an embodiment of the telecommunication apparatus 118 with a communications module 1102, an identification module 1104, an ID request module 1106, an ID confirmation module 1108, a profile permission module 1202, and a profile access module 1204 which are substantially similar to those described above in relation to the apparatuses 1100, 1200 of FIGS. 11 and 12. In various embodiments, the apparatus 1300 may also include a communications module 1302, a limit module 1304 in the profile access module 1204, a notification module 1306, and a registration module 1308, which are described below.

In one embodiment, the apparatus 1300 operates to verify the identity of the customer, as with the apparatus 1100 of FIG. 11, and receives sensitive information from the customer profile 122 without disclosing the information to the customer service representative, as with the apparatus 1200 of FIG. 12. Note that the communications module 1102, an identification module 1104, an ID request module 1106, an ID confirmation module 1108, a profile permission module 1202, and a profile access module 1204 operate while the customer is telephonically connected to the customer service representative. In one embodiment, the profile permission module 1202 receives electronic access to the customer profile 122 after the ID confirmation module 1108 receives the identification confirmation and the profile access module 1204 accesses information in the customer profile 122 after the profile permission module 1202 receives electronic access to the customer profile 122.

The apparatus 1300, in one embodiment, includes a communications module 1302 that establishes a data connection, in conjunction with the telephonic connection, between the company and the customer. For example, the network 114 may be a cellular network that transmits voice and data and the electronic device 106 may be capable of data transmission, running applications, including the client apparatus 120, etc. during a phone call to the customer service representative. In another embodiment, the communications module 1302 establishes a data connection and the telephonic connection over separate channels, separate communication pathways, etc. In one embodiment, the data connection and the telephonic connection are established using the electronic device 106 of the customer, where the electronic device 106 is a single electronic device. In another embodiment, the communications module 1302 is substantially similar to the data communications module 312 of the apparatus 300 of FIG. 3.

In one embodiment, the apparatus 1300 includes a profile access module 1204 that includes a limit module 1304 that limits information transmitted from the customer profile 122 to information relevant to business interactions between the customer and the company and that excludes transmitting of information in the customer profile 122 that is not relevant to business interactions between the customer and the company. For example, the company may be a bank and the limit module 1304 may limit the information transmitted from the customer profile 122 to customer bank account information, a customer address, a social security number of the customer, and other information relevant to banking while excluding transmission of medical information stored in the customer profile 122. In one embodiment, the telecommunication apparatus 118 is limited during a setup process to information relevant to the company operating the telecommunication apparatus 118. In other embodiments, the limit module 1304 limits information based on a transaction type. One of skill in the art will recognize other ways that the limit module 1304 may limit information transmitted from the customer profile 122 to information relevant to the type of business transactions occurring between the customer and the company.

The apparatus 1300, in one embodiment, includes a notification module 1306 that notifies the customer service representative that the profile access module 1204 has received the information from the customer profile 122. In another embodiment, the notification module 1306 notifies the customer service representative that the ID confirmation module 1108 received the identification confirmation. In an embodiment where the apparatus includes the modules 1102, 1104, 1106, 1108, 1202, 1204 for both verifying identification of the customer and receiving sensitive information, the notification may notify the customer service representative that the profile access module 1204 has received the information from the customer profile 122 and notify the customer service representative that the ID confirmation module 1108 received the identification confirmation. Where the notification module 1306 notifies the customer service representative that the ID confirmation module 1108 received the identification confirmation, the notification to the customer service representative and the identification confirmation do not include the identifying information input by the customer or stored in the customer profile 122. Where the notification module 1306 that notifies the customer service representative that the profile access module 1204 has received the information from the customer profile 122, the notification does not include the information from the customer profile 122.

The apparatus 1300, in one embodiment, includes a registration module 1308 that receives and stores information in the customer profile 122 of the customer. The registration module 1308 receives and stores the information in the customer profile 122 in a transaction unrelated to the telephonic connection. While the registration module 1308 is shown in the telecommunication apparatus 118, the telecommunication apparatus 118 may merely facilitate storing information in the customer profile 122 without receiving information in the customer profile 122 so that the information is transmitted from the customer to the customer profile 122 without the information going to or through the computer 102 of the company. In other embodiments, the registration module 1308 is located in the client apparatus 120, the server 110 or other location independent of the computer system (i.e. computer 102) of the company. For example, a group or service provider independent of the company may solicit customers to store a customer profile 122 and may contract with companies to use a service where customers can validate identity without sending identifying information to the company and may send sensitive information from the customer profile 122 of the customer to the company without a customer service representative viewing the sensitive information.

In one embodiment, information passed among the company, the customer, and third-parties includes one or more tokens, where the identifier and/or the information from the customer profile are transmitted using one or more tokens. The tokens may be substantially similar to the tokens discussed above in relation to the apparatuses 200, 300, 400, 500 of FIGS. 2-5.

Figure 14:
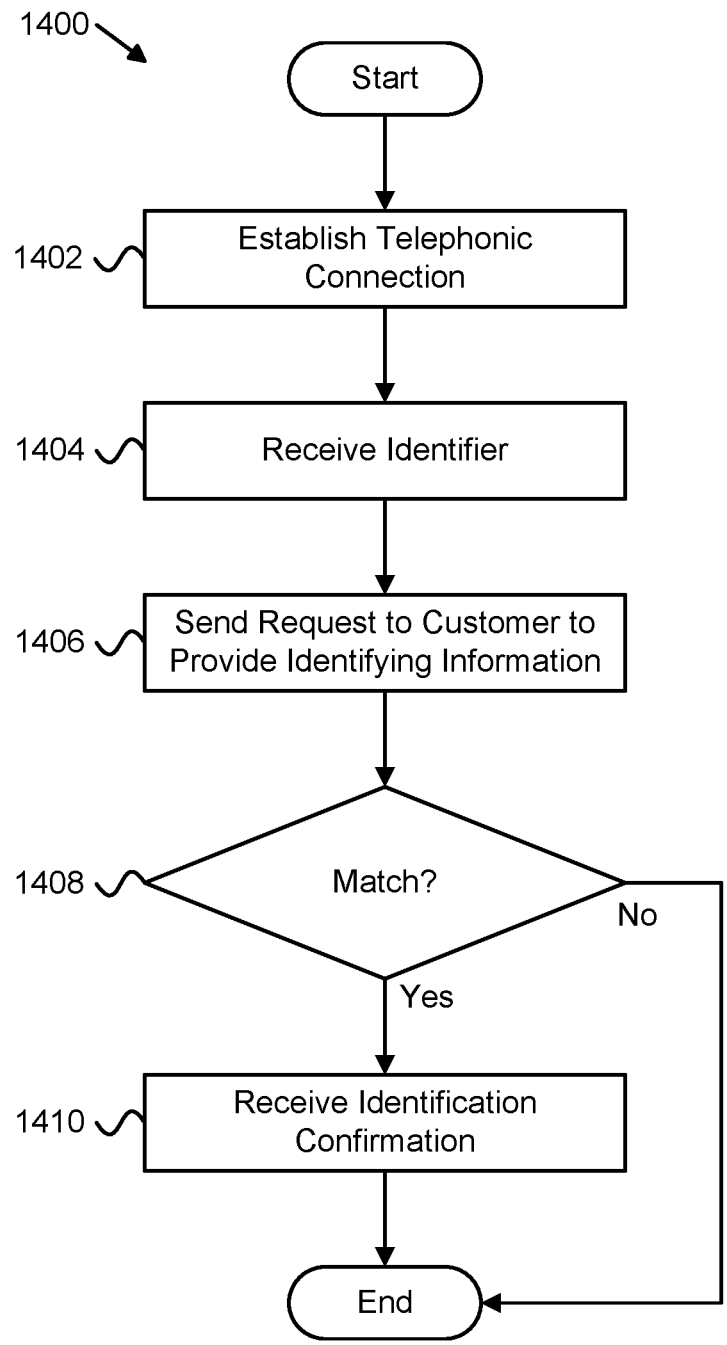
FIG. 14 is a schematic flow chart illustrating an embodiment of a method for confirming identification of a customer.

FIG. 14 is a schematic flow chart illustrating an embodiment of a method 1400 for confirming identification of a customer. The method 1400 begins and establishes 1402 a telephonic connection between a customer service representative of a company and a customer through an electronic device 106 of the customer. In one embodiment, the communications module 1102 establishes 1402 the telephonic connection. The method 1400 receives 1404 an identifier, where the identifier alerts the customer service representative and/or a computer system of the company that the customer has a customer profile 122. The customer profile 122 includes information to identify the customer. The identifier is received in conjunction with the telephonic connection and the customer profile 122 stored previous to the telephonic connection. In one embodiment, the identification module 1104 receives 1404 an identifier.

The method 1400 send 1406 a request to the customer to provide identifying information via the electronic device 106 of the customer. The identifying information is input through the electronic device 106 by the customer using an electronic, non-verbal technique. In another embodiment, at least a portion of the identifying input is masked from the customer service representative. In one example, the ID request module 1106 sends 1406 a request to the customer to provide identifying information via the electronic device 106. The method 1400 determines 1408 if the identifying information input by the customer matches the information to identify the customer in the customer profile 122. If the method 1400 determines 1408 that the identifying information input by the customer matches the information to identify the customer in the customer profile 122, the method 1400 receives 1410 an identification confirmation, and the method 1400 ends. If the method 1400 determines 1408 that the identifying information input by the customer does not match the information to identify the customer in the customer profile 122, the method 1400 ends. in one example, the ID confirmation module 1108 receives 1410 the identification confirmation.

Figure 15:
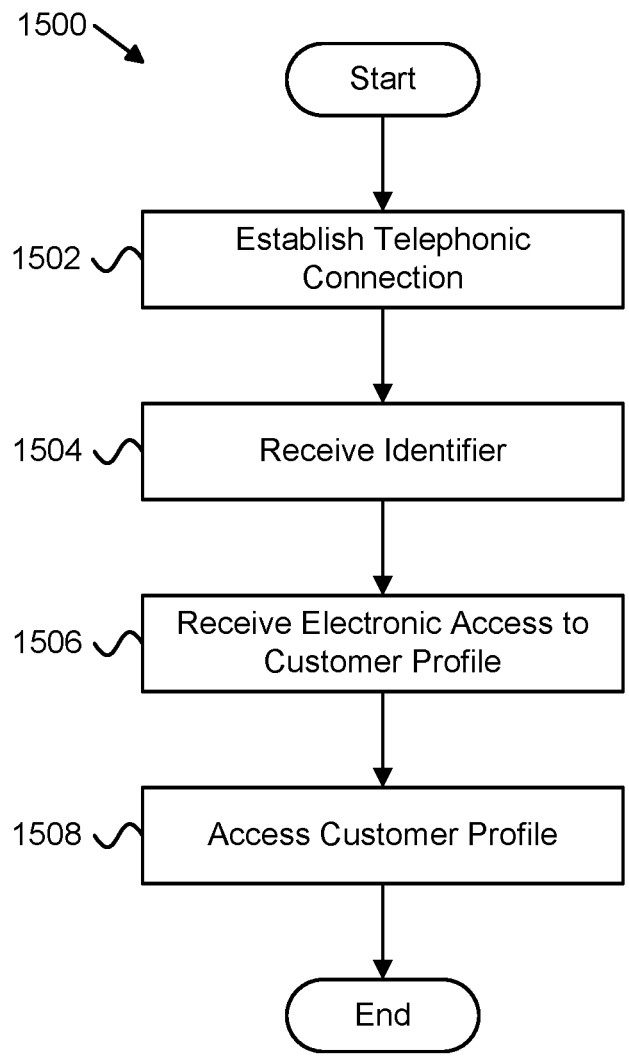
FIG. 15 is a schematic flow chart illustrating an embodiment of a method for receiving sensitive information.

FIG. 15 is a schematic flow chart illustrating an embodiment of a method 1500 for receiving sensitive information. The method 1500 begins and establishes 1502 a telephonic connection between a customer service representative of a company and a customer through an electronic device 106 of the customer. In one embodiment, the communications module 1102 establishes 1502 the telephonic connection. The method 1500 receives 1504 an identifier, where the identifier alerts the customer service representative and/or a computer system of the company that the customer has a customer profile 122. The customer profile 122 includes information to identify the customer. The identifier is received in conjunction with the telephonic connection and the customer profile 122 stored previous to the telephonic connection. In one embodiment, the identification module 1104 receives 1504 an identifier.

The method 1500 receives 1506 electronic access to the customer profile 122. The customer profile 122 includes personal information of the customer and the customer profile 122 is stored electronically in a computer system external to a computer system available to the company and to the customer service representative. In one example, the profile permission module 1202 receives 1506 electronic access to the customer profile 122. The method 1500 accesses 1508 the customer profile 122 to transmit information from the customer profile 122 to the computer system of the company over a network, where the transmitted information of the customer profile 122 is unavailable for viewing by the customer service representative, and the method 1500 ends. In one embodiment, the profile access module 1204 accesses 1508 the customer profile 122.

Figure 16:
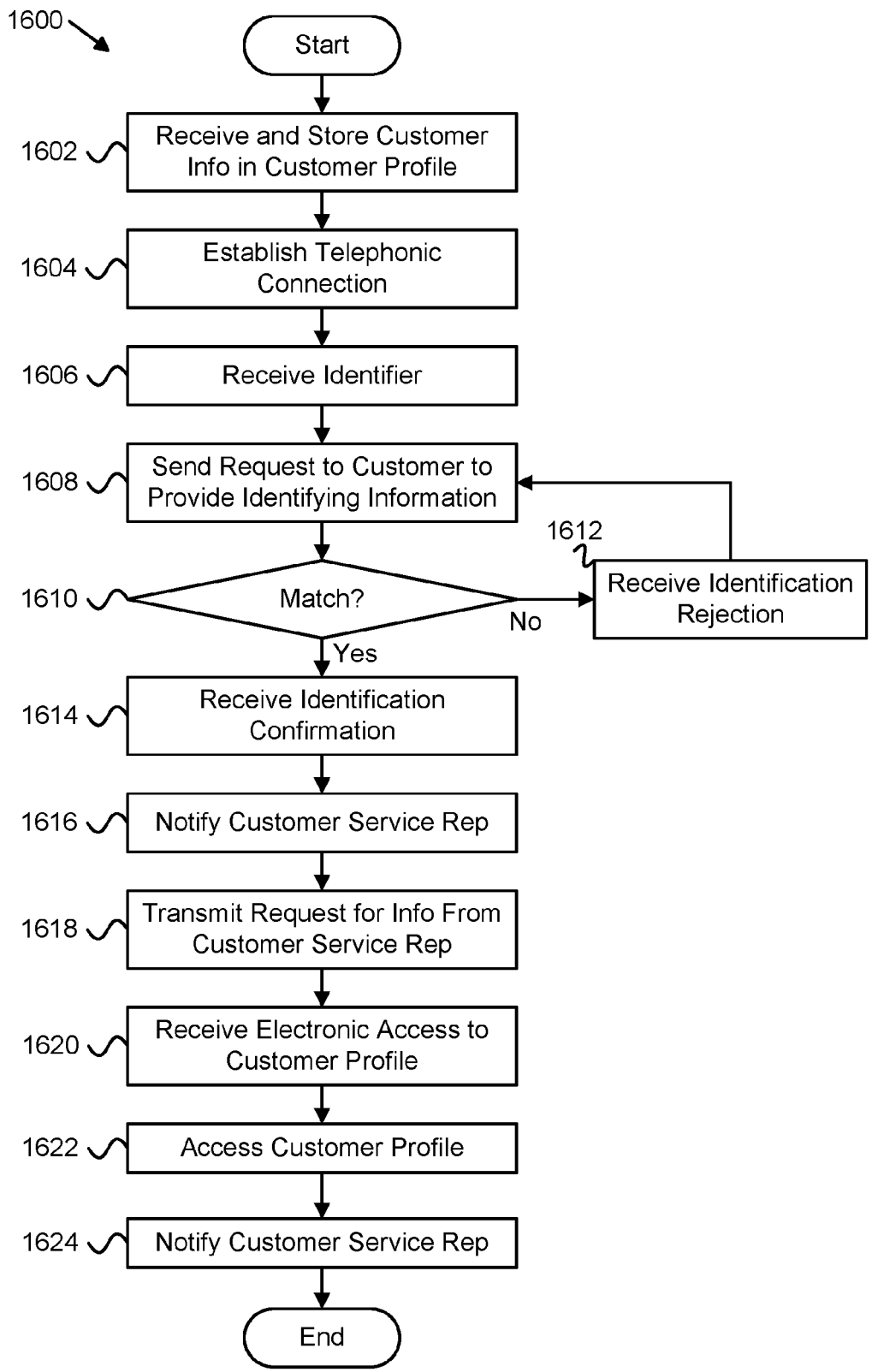
FIG. 16 is a schematic flow chart illustrating an embodiment of a method for confirming identification of a customer and receiving sensitive information.

FIG. 16 is a schematic flow chart illustrating an embodiment of a method 1600 for confirming identification of a customer and receiving sensitive information. The method 1600 begins and receives 1602 and stores customer information in a customer profile 122 of a customer. In one embodiment, the registration module 1308 receives 1602 and stores customer information in a customer profile 122. The method 1600 establishes 1604 a telephonic connection between a customer service representative of a company and a customer through an electronic device 106 of the customer. In one embodiment, the communications module 1102 establishes 1604 the telephonic connection. The method 1500 receives 1606 an identifier, where the identifier alerts the customer service representative and/or a computer system of the company that the customer has a customer profile 122. The customer profile 122 includes information to identify the customer. The identifier is received in conjunction with the telephonic connection and the customer profile 122 stored previous to the telephonic connection. In one embodiment, the identification module 1104 receives 1606 the identifier.

The method 1600 sends 1608 a request to the customer to provide identifying information via the electronic device 106 of the customer, where the identifying information is input through the electronic device 106 by the customer using an electronic, non-verbal technique. In one embodiment, at least a portion of the identifying information is masked from the customer service representative. The method 1600 determines 1610 if the identifying information input by the customer matches the information to identify the customer in the customer profile 122. If the method 1600 determines 1610 that the identifying information input by the customer does not match the information to identify the customer in the customer profile 122, the method 1600 receives 1612 an identification rejection and returns and sends 1608 another request to the customer to provide identifying information via the electronic device 106 of the customer. If the method 1600 determines 1610 that the identifying information input by the customer matches the information to identify the customer in the customer profile 122, the method 1600 receives 1614 an identification confirmation and notifies 1616 the customer service representative of the identification confirmation. The notification module 1306 notifies 1616 the customer service representative.

The method 1600 transmits 1618 a request from the customer service representative to the customer to provide information from the customer profile 122. For example, the customer service representative may request the information using the telephonic connection or electronically through the client apparatus 120. The request may be for specific information and the customer may authorize specific information from the customer profile 122 to be transmitted. The method 1600 receives 1620 electronic access to the customer profile 122, where the customer profile includes personal information of the customer. The customer profile 122 is stored electronically in a computer system external to a computer system available to the company and to the customer service representative. The method 1600 accesses 1622 the customer profile 122 to transmit information from the customer profile 122 to the computer system of the company over a network, where the transmitted information of the customer profile 122 is unavailable for viewing by the customer service representative, the method 1600 notifies 1624 the customer service representative that the information from the customer profile 122 has been accessed, and the method 1600 ends. In one embodiment, the notification module 1306 notifies 1624 the customer service representative.

Figure 17:
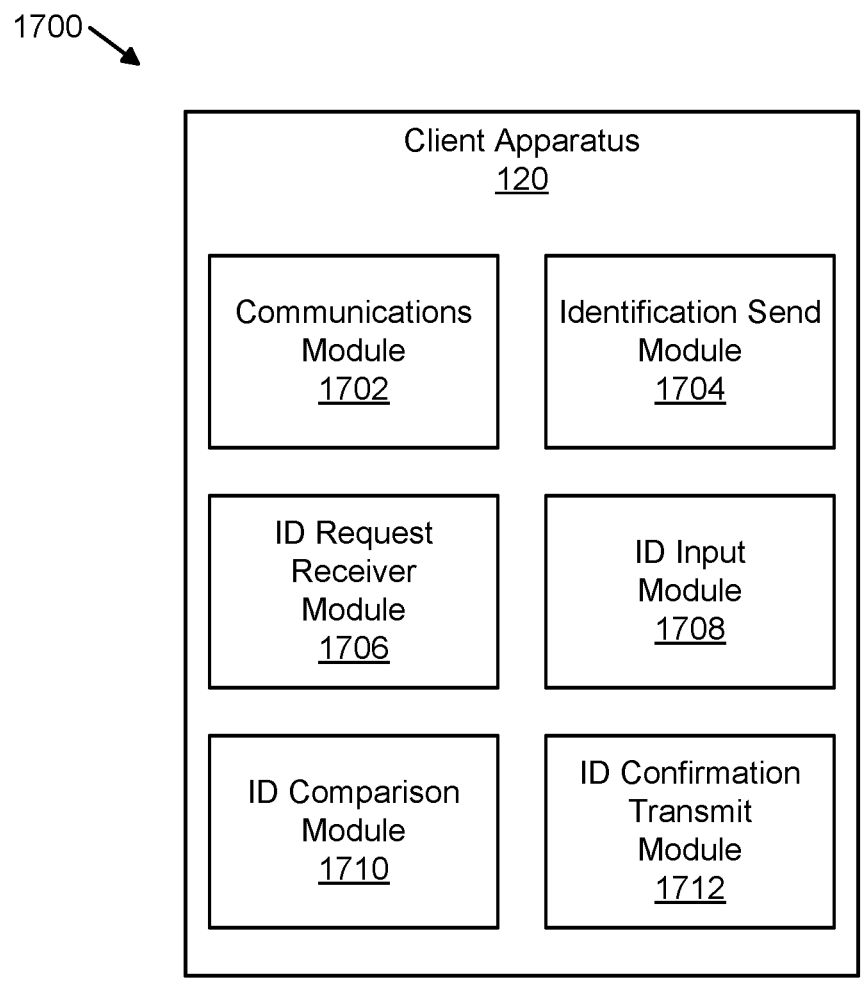
FIG. 17 is a schematic block diagram illustrating an embodiment of an apparatus for a customer to confirm identification.

FIG. 17 is a schematic block diagram illustrating an embodiment of an apparatus 1700 for a customer to confirm identification. The apparatus 1700 includes one embodiment of the client apparatus 120 that includes a communications module 1702, an identification send module 1704, an ID request receiver module 1706, an ID input module 1708, an ID comparison module 1710, and an ID confirmation transmit module 1712, which are described below. The client apparatus 120 is shown in the electronic device 106 in FIG. 1B, but may be in the server 110 or may be split between the electronic device 106 of the customer and one or more other computing devices.

The apparatus 1700, in one embodiment, includes a communications module 1702 that a telephonic connection between a customer service representative of a company and a customer through an electronic device 106 of a customer. For example, the client apparatus 120 may include an application running on the electronic device 106 and the customer may access the application and the communications module 1702 may establish the telephonic connection. In one embodiment, the communications module 1102 of the telecommunication apparatus 118 and the communications module 1702 of the client apparatus 120 work together to establish the telephonic connection.

The apparatus 1700, in one embodiment, includes an identification send module 1704 that sends an identifier, where the identifier alerts the customer service representative and/or a computer system of the company that the customer has a customer profile 122. The customer profile 122 includes information to identify the customer, and the identifier is received in conjunction with the telephonic connection. The customer profile 122 is stored previous to the telephonic connection. For example, the registration module 1308 may be part of the client apparatus 120 and may be used to receive and store information from the customer in the customer profile 122 of the customer.

For example, when a customer calls a company and establishes a telephonic connection with a customer service representative of the company, the identification send module 1704 may alert the customer service representative that the customer has previously stored a customer profile 122 and is a user of an application that facilitates identification of the customer and/or transfer of sensitive information to the company without the customer service representative viewing the sensitive information. The identification send module 1704 may alert the customer service representative so that the customer service representative handles the call differently than other calls where a customer does not have a stored customer profile 122. The identification send module 1704 may alert the customer service representative at the beginning of the telephonic connection or at a time chosen by the customer.

The apparatus 1700 includes, in one embodiment, an ID request receiver module 1706 that receives a request from the customer service representative and/or the computer system of the company to provide identifying information via the electronic device 106 of the customer and that displays the request to the customer via the electronic device 106. For example, during a telephone communication between the customer and the customer service representative, the customer may need to verify the customer's identity for some reason. For example, the customer service representative may require confirmation of identity of the customer before providing information to the customer. The request, in one embodiment, is an electronic request initiated by the customer service representative or by the telecommunications apparatus 118 that arrives through the electronic device 106.

The apparatus 1700, in one example, includes an ID input module 1708 that receives through the electronic device 106 the identifying information from the customer using an electronic, non-verbal technique. In one embodiment, at least a portion of the identifying information is masked from the customer service representative. For example, the ID input module 1708 may receive the identifying information through a fingerprint reader or other biometric reader, a camera performing a retina scan on the customer, entry of a password by the customer via a keyboard of the electronic device 106, etc. In each instance, the input of the customer of the identifying information may be masked from the customer service representative.

The apparatus 1700, in one embodiment, includes an ID comparison module 1710 that compares the identifying information input by the customer with the information to identify the customer in the customer profile 122. For example, if the customer previously stored a fingerprint of the right index finger in the customer profile, the ID comparison module 1710 compares input from a fingerprint reader on the electronic device 106 or connected to the electronic device 106. The ID comparison module 1710 compares the type of information input by the customer with similar information stored in the customer profile 122. In one embodiment, the customer profile 122 is secure to prevent tampering by unauthorized individuals so that the comparison of the ID comparison module 1710 has a high degree of accuracy in verifying the identity of the customer.

The apparatus 1700, in one embodiment, includes an ID confirmation transmit module 1712 that transmits an identification confirmation to the computer system of the company in response to the identifying information input by the customer matching the information to identify the customer in the customer profile 122. In another embodiment, the ID confirmation transmit module 1712 transmits an identification rejection where the identifying information input by the user does not match the information in the customer profile 122. The identification confirmation does not include the identifying information input by the customer or stored in the customer profile 122, which facilitates verification of identity of the customer without exposing the customer service representative to the identifying information.

Figure 18:
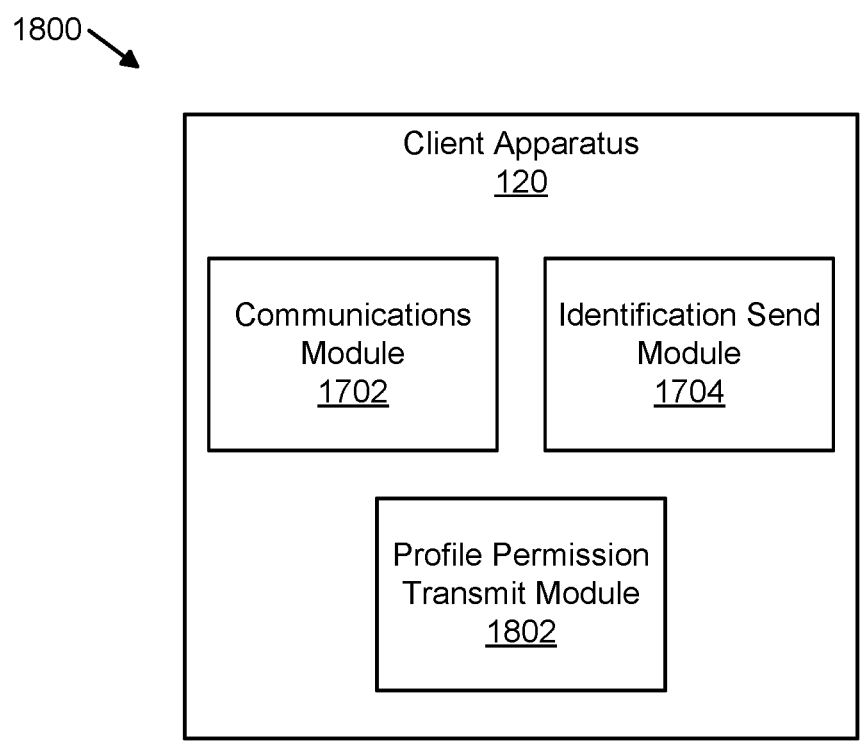
FIG. 18 is a schematic block diagram illustrating an embodiment of an apparatus for a customer to control transmission of sensitive information.

FIG. 18 is a schematic block diagram illustrating an embodiment of an apparatus 1800 for a customer to control transmission of sensitive information. The apparatus 1800 includes one embodiment of a client apparatus 120 with a communications module 1702, and an identification send module 1704, which are substantially similar to those described above in relation to the apparatus 1700 of FIG. 17. The apparatus 1800 also includes a profile permission transmit module 1802, which is described below.

The apparatus 1900, in one embodiment, includes a profile permission transmit module 1802 that provides electronic access to the customer profile 122. The customer profile 122 includes personal information of the customer and the customer profile 122 is stored electronically in a computer system external to a computer system available to the company and to the customer service representative. The profile permission transmit module 1802, in one embodiment, provides electronic access to the customer profile 122 after a verification process. In another embodiment, the profile permission transmit module 1802 provides electronic access to the customer profile 122 without verifying identification of the customer.

In one embodiment, the profile permission transmit module 1802 provides access to the information in the customer profile 122 after a request for information from the telecommunications apparatus 118, the computing system of the company, or the customer service representative. In another embodiment, the computer system of the company accesses the customer profile 122 to transmit information from the customer profile 122 to the computer system of the company over a network, where the transmitted information of the customer profile 122 is unavailable for viewing by the customer service representative.

Figure 19:
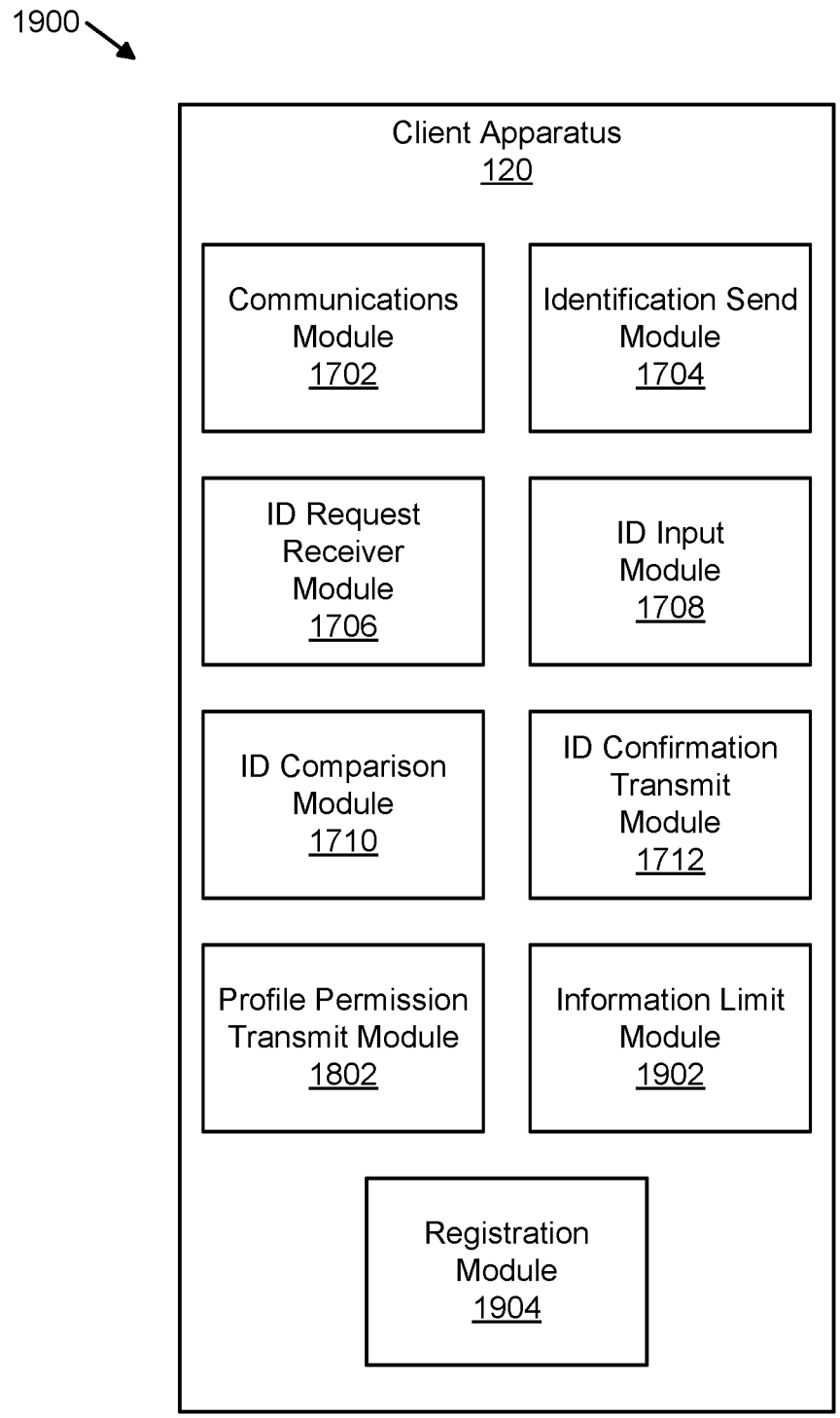
FIG. 19 is a schematic block diagram illustrating an embodiment of an apparatus for a customer to confirm identification and to control transmission of sensitive information.

FIG. 19 is a schematic block diagram illustrating an embodiment of an apparatus 1900 for a customer to confirm identification and to control transmission of sensitive information. The apparatus 1900 includes another embodiment of the client apparatus 120 with a communications module 1702, an identification send module 1704, an ID request receiver module 1706, an ID input module 1708, an ID comparison module 1710, and an ID confirmation transmit module 1712, which are substantially similar to those describe above in relation to the apparatus 1700 of FIG. 17 and a profile permission transmit module 1802, which is substantially similar to that describe above in relation to the apparatus 1800 of FIG. 18. The apparatus 1900, in various embodiments, includes an information limit module 1902, and a registration module 1904, which are described below.

In one embodiment, the apparatus 1900 includes an information limit module 1902 that limits which information in the customer profile 122 is accessible by the computer system of the company. For example, the information limit module 1902 may detect a company type and may make available only information pertaining to the business transactions of the company. In another embodiment, the information limit module 1902 receives, from the customer, selections of which information in the customer profile 122 is accessible by the computer system of the company. For example, where the company is a healthcare provider, the information limit module 1902 may receive input from the customer to limit information made accessible to the company to only medical information. One of skill in the art will recognize other ways to limit which information in a customer profile 122 is accessible to a company.

The apparatus 1900, in one embodiment, includes a registration module 1904 that receives and stores information in the customer profile 122 of the customer. The registration module 1904 receives and stores the information in the customer profile 122 in a transaction unrelated to the telephonic connection. For example, the customer may store personal information in the customer profile 122 to be used with various companies such as medical professionals, airlines, financial institutions, vendors, merchants, government institutions, etc. before the information is accessed by the companies.

Figure 20:
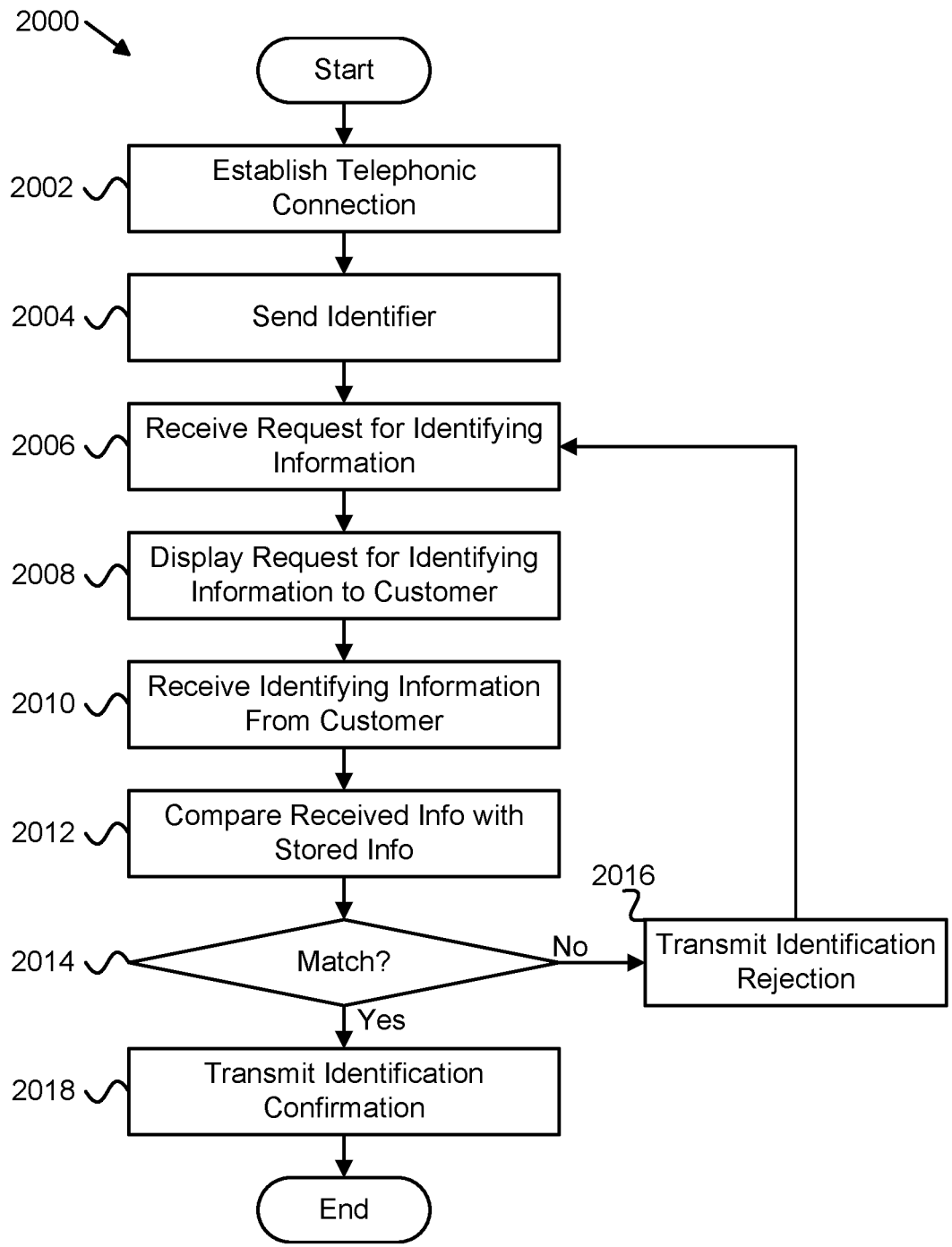
FIG. 20 is a schematic flow chart illustrating an embodiment of a method for a customer to confirm identification.

FIG. 20 is a schematic flow chart illustrating an embodiment of a method 2000 for a customer to confirm identification. The method 2000 begins and establishes 2002 a telephonic connection between a customer service representative of a company and a customer through an electronic device 106 of the customer. The communications module 1702 may establish 2002 the telephonic connection, in one embodiment. The method 2000 sends 2004 an identifier, where the identifier alerts the customer service representative and/or a computer system of the company that the customer has a customer profile 122. The customer profile 122 includes information to identify the customer and the identifier is received in conjunction with the telephonic connection. The customer profile 122 is stored previous to the telephonic connection. In one embodiment, the identification send module 1704 sends 2004 the identifier.

The method 2000 receives 2006 a request from the customer service representative to provide identifying information via the electronic device 106 of the customer and displays 2008 the request to the customer via the electronic device 106. The ID request receiver module 1706, in one embodiment, receives 2006 the request and displays 2008 the request on the electronic device 106. The method 2000 receives 2010 the identifying information through the electronic device 106 from the customer using an electronic, non-verbal technique. The identifying information may be masked from the customer service representative. For example, the ID input module 1708 may receive 2010 the identifying information from the customer.

The method 2000 compares 2012 the identifying information input by the customer with the information to identify the customer in the customer profile 122. In one example, the ID comparison module 1710 compares 2012 the identifying information input by the customer with the information to identify the customer in the customer profile 122. The method 2000 determines 2014 if the identifying information input by the customer matches the information to identify the customer in the customer profile 122. If the method 2000 determines 2014 that the identifying information input by the customer does not match the information to identify the customer in the customer profile 122, the method 2000 transmits 2016 an identification rejection to the computer system of the company and/or to the customer service representative, and the method 2000 returns and receives 2006 a request for the user to input identifying information. If the method 2000 determines 2014 that the identifying information input by the customer matches the information to identify the customer in the customer profile 122, the method 2000 transmits an identification confirmation to the computer system of the company, and the method 2000 ends. The ID confirmation transmit module 1712 may determine 2014 if the identifying information input by the customer matches the information to identify the customer in the customer profile 122, may transmit 2016 the identification rejection, and may transmit 2018 the identification confirmation.

Figure 21:
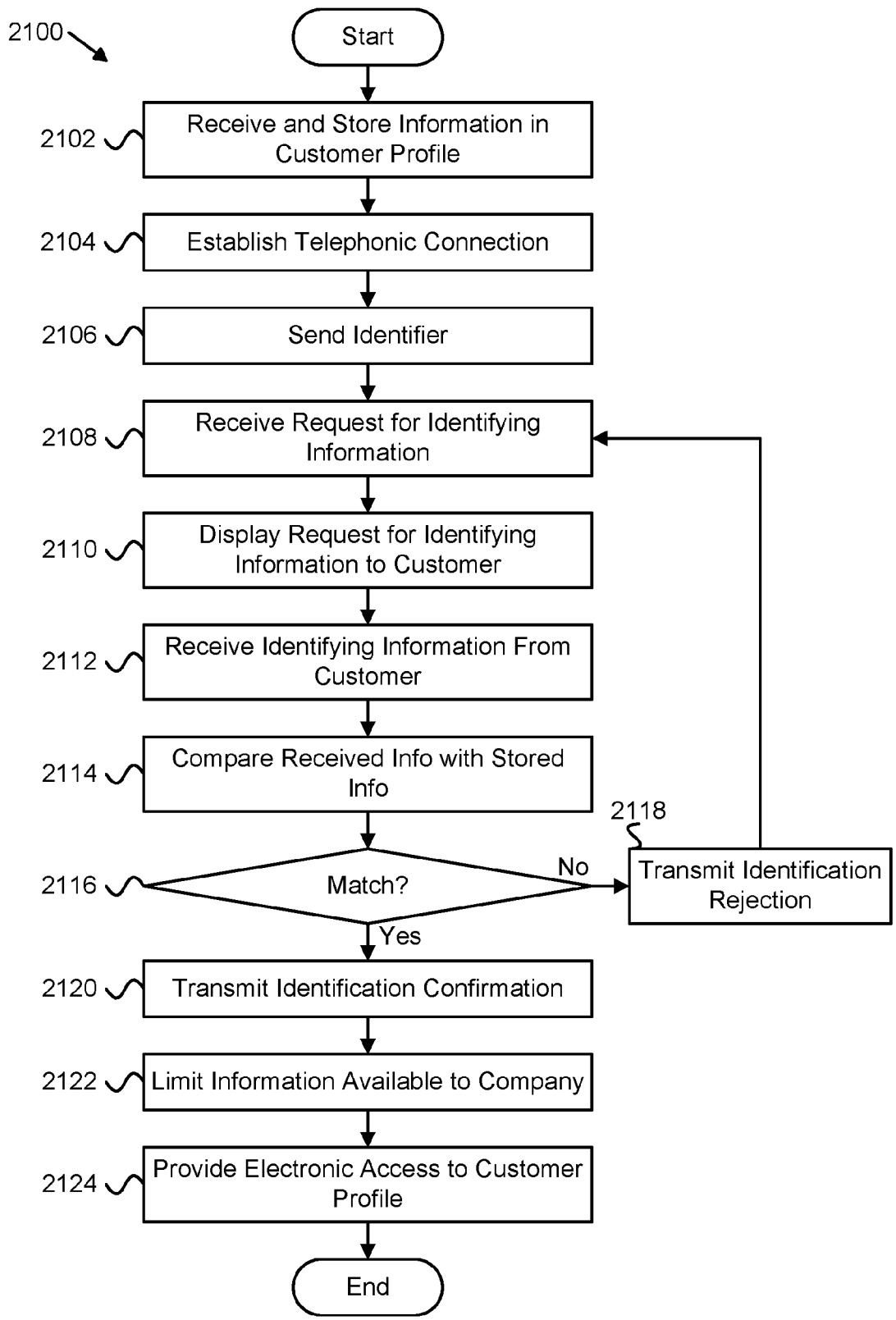
FIG. 21 is a schematic flow chart illustrating an embodiment of a method for a customer to confirm identification and to control transmission of sensitive information.

FIG. 21 is a schematic flow chart illustrating an embodiment of a method 2100 for a customer to confirm identification and to control transmission of sensitive information. The method 2100 begins and receives 2102 and stores information in the customer profile 122 of the customer. The registration module 1904, in one embodiment, receives 2102 and stores information in the customer profile 122 of the customer. The method 2100 establishes 2104 a telephonic connection between a customer service representative of a company and a customer through an electronic device 106 of the customer. The method 2100 sends 2106 an identifier, where the identifier alerts the customer service representative and/or a computer system of the company that the customer has a customer profile 122. The customer profile 122 includes information to identify the customer and the identifier is received in conjunction with the telephonic connection. The customer profile 122 is stored previous to the telephonic connection.

The method 2100 receives 2108 a request from the customer service representative and/or computer system of the company to provide identifying information via the electronic device 106 of the customer and displays 2110 the request to the customer via the electronic device 106. The method 2100 receives 2112 identifying information from the customer using an electronic, non-verbal technique. The identifying information may be masked from the customer service representative.

The method 2100 compares 2114 the identifying information input by the customer with the information to identify the customer in the customer profile 122. The method 2100 determines 2116 if the identifying information input by the customer matches the information to identify the customer in the customer profile 122. If the method 2100 determines 2116 that the identifying information input by the customer does not match the information to identify the customer in the customer profile 122, the method 2100 transmits 2118 an identification rejection to the computer system of the company and/or to the customer service representative, and the method 2100 returns and receives 2108 a request for the user to input identifying information.

If the method 2100 determines 2116 that the identifying information input by the customer matches the information to identify the customer in the customer profile 122, the method 2100 transmits 2120 an identification confirmation to the computer system of the company. The method 2100 limits 2122 which information in the customer profile 122 is accessible by the computer system of the company. In one embodiment, the method 2100 receives, from the customer, selections of which information in the customer profile 122 is accessible by the computer system of the company. In one embodiment, the information limit module 1902 limits 2122 which information in the customer profile 122 is accessible by the computer system of the company. The method 2100 provides 2124 electronic access to the customer profile 122, and the method 2100 ends. The customer profile 122 includes personal information of the customer and the customer profile 122 is stored electronically in a computer system external to a computer system available to the company and to the customer service representative. In one example, the profile permission transmit module 1802 provides 2124 electronic access to the customer profile 122.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a communications module that establishes a verbal communication between an automated attendant of a company and a customer through an electronic device in the possession of the customer;

an identification module that receives an identifier, the identifier alerting one or more of the automated attendant and a computer system of the company that the customer has a customer profile stored electronically, the customer profile comprising information to identify the customer, the identifier received in conjunction with the verbal communication, the customer profile stored previous to the verbal communication, the identifier comprising an electronic data signal;

an ID confirmation module that receives an identification confirmation in response to identifying information input by the customer matching the information to identify the customer in the customer profile, the identity of the customer being confirmed electronically; and a notification module that sends a message to the automated attendant indicating that the ID confirmation module received the identification confirmation, wherein at least a portion of said modules comprise one or more of hardware and executable code, the executable code stored on one or more non-transitory, tangible computer readable storage media.

2. The apparatus of claim 1, further comprising:
a profile permission module that receives electronic access to the customer profile, the customer profile comprising identifying information of the customer, wherein the profile permission module receives electronic access to the customer profile after the ID confirmation module receives the identification confirmation; and
a profile access module that accesses the customer profile to transmit information from the customer profile to the computer system of the company over a computer network.

3. The apparatus of claim 2, wherein the customer profile is stored electronically in a computer system external to a computer system available to the company and to the automated attendant.

4. The apparatus of claim 1, wherein the communications module establishes a data connection, in conjunction with the verbal communication, between the company and the customer.

5. The apparatus of claim 1, wherein the identifying information stored in the customer profile comprises one or more of a password and biometric information and wherein the identifying information input by the customer is input through the electronic device using one or more of a camera of the electronic device, a biometric reader of the electronic device, a microphone of the electronic device and a keyboard of the electronic device.

6. The apparatus of claim 1, wherein the customer profile is stored via a server separate from the electronic device of the customer and the computer system of the company and wherein the server sends the identification confirmation received by the ID confirmation module.

7. The apparatus of claim 1, wherein an ID request module sends a request to the customer to provide the identifying information by one or more of:
sending an electronic message to the electronic device; and
transmitting a voice prompt of the automated attendant.

8. The apparatus of claim 1, wherein the customer profile is stored by a computer system of the company.

9. The apparatus of claim 1, further comprising a registration module that receives and stores information in the customer profile of the customer, the registration module receiving and storing the information in the customer profile in a transaction unrelated to the verbal communication.

10. The apparatus of claim 1, wherein the customer profile of the customer comprises one or more of a shipping address, a residential address, a business address, a phone number, a fax number, an email address, a birth date, a social security number, healthcare information, a finger print, a retina scan, a voice print, a password, a user name, a preference, family information, security question information and financial information of the customer.

11. The apparatus of claim 1, further comprising:
an ID comparison module that compares the identifying information input by the customer with the information to identify the customer in the customer profile in an electronic process; and
an ID confirmation transmit module that transmits an identification confirmation to the computer system of the company in response to the identifying information input by the customer matching the information to identify the customer in the customer profile.

12. The apparatus of claim 1, wherein the customer profile comprises billing information sufficient for the company to process a charge for an order of one or more of a service and merchandise offered by the company, the apparatus further comprising a transaction module that processes the charge using the billing information in response to a customer approval of the order.

13. A method comprising:
establishing a verbal communication between an automated attendant of a company and a customer through an electronic device of the customer;
receiving an identifier, the identifier alerting one or more of the automated attendant and a computer system of the company that the customer has a customer profile stored electronically, the customer profile comprising information to identify the customer, the identifier received in conjunction with the verbal communication, the customer profile stored previous to the verbal communication, the identifier comprising an electronic data signal;
receiving an identification confirmation in response to identifying information input by the customer matching the information to identify the customer in the customer profile, the identity of the customer being confirmed electronically; and
sending a message to the automated attendant indicating that the identification confirmation has been received.

14. The method of claim 13, further comprising:
receiving electronic access to the customer profile, the customer profile comprising personal information of the customer, wherein receiving electronic access to the customer profile is in response to receiving the identification confirmation; and
accessing the customer profile to transmit information from the customer profile to the computer system of the company over a network.

15. The method of claim 13, wherein the identifying information stored in the customer profile comprises one or more of a password and biometric information and wherein the identifying information input by the customer is input through the electronic device using one or more of a camera of the electronic device, a biometric reader of the electronic device, a microphone of the electronic device, and a keyboard of the electronic device.

16. The method of claim 13, wherein the customer profile is stored electronically in a computer system external to a computer system available to the company.

17. The method of claim 13, further comprising receiving and storing information in the customer profile of the customer, wherein receiving and storing the information in the customer profile comprises a transaction unrelated to the verbal communication.

18. The method of claim 13, wherein the customer profile is stored by a computer system of the company.

19. The method of claim 13, wherein the customer profile comprises billing information sufficient for the company to process a charge for an order of one or more of a service and merchandise offered by the company, the method further comprising processing the charge using the billing information in response to a customer approval of the order.

* * * * *